(12) United States Patent
Boyle et al.

(10) Patent No.: US 10,199,712 B1
(45) Date of Patent: Feb. 5, 2019

(54) APPARATUS, METHOD, AND SYSTEM FOR FACTORY WIRING AND/OR AIMING OF DEVICES ON DUAL PURPOSE MONOPOLES

(71) Applicant: Musco Corporation, Oskaloosa, IA (US)

(72) Inventors: Timothy J. Boyle, Oskaloosa, IA (US); Kurt C. Herr, Jr., Centerville, IA (US); Gregory N. Kubbe, Ottumwa, IA (US); Andrew D. Mullen, Albia, IA (US); Nathanael J. Van Ee, Oskaloosa, IA (US)

(73) Assignee: Musco Corporation, Oskaloosa, IA (US)

( * ) Notice: Subject to any disclaimer, the term of this patent is extended or adjusted under 35 U.S.C. 154(b) by 124 days.

(21) Appl. No.: 15/260,464

(22) Filed: Sep. 9, 2016

Related U.S. Application Data

(60) Provisional application No. 62/217,619, filed on Sep. 11, 2015.

(51) Int. Cl.
| | |
|---|---|
| *H01Q 1/12* | (2006.01) |
| *H04W 16/28* | (2009.01) |
| *H01Q 1/24* | (2006.01) |
| *F21S 8/08* | (2006.01) |
| *F21V 21/14* | (2006.01) |
| *H04W 88/08* | (2009.01) |

(52) U.S. Cl.
CPC ............ *H01Q 1/1242* (2013.01); *F21S 8/085* (2013.01); *F21V 21/14* (2013.01); *H01Q 1/241* (2013.01); *H04W 16/28* (2013.01); *H04W 88/08* (2013.01)

(58) Field of Classification Search
CPC ..... H01Q 1/1242; H01Q 1/241; H04W 16/28; H04W 88/08; F21S 8/085; F21S 8/086; F21V 21/14; F21V 21/116; F21V 33/0052; F21W 2131/103; F21W 2131/10
See application file for complete search history.

(56) References Cited

U.S. PATENT DOCUMENTS

| | | |
|---|---|---|
| 2,531,183 A | 11/1950 | Wisner |
| 2,579,139 A | 12/1951 | Chipley |

(Continued)

OTHER PUBLICATIONS

Commscope, Inc., Assembly Drawing, Concealed Monopole, 2 RAD 9 RRU, OVP 100ft AGL, SSC-760215913-100, Sep. 1, 2015.

(Continued)

*Primary Examiner* — Peggy Neils
(74) *Attorney, Agent, or Firm* — Jessica R. Buer

(57) ABSTRACT

Disclosed herein are means and methods by which unrelated or outside entities may add value to strategic partnerships with mobile network service providers—beyond providing preexisting elevating structures. In the state of the art, mobile network service providers must rely upon multiple technicians using multiple tools to pinpoint where a tower or pole exists, and must perform precise horizontal and vertical aiming of each mobile network device when elevated and mounted at a particular position on said tower or pole. Said means and methods are directed to reducing the time and cost associated with this onsite commissioning of mobile network devices by factory wiring and factory aiming at least some of these devices in a commensurate fashion to factory wiring and factory aiming of disparate devices such as lighting fixtures.

11 Claims, 22 Drawing Sheets

(56) References Cited

U.S. PATENT DOCUMENTS

| | | | |
|---|---|---|---|
| 3,435,124 | A | 3/1969 | Channell |
| D329,433 | S | 9/1992 | Wilson |
| D331,927 | S | 12/1992 | Birri |
| D333,661 | S | 3/1993 | Elliott et al. |
| D369,785 | S | 5/1996 | Cote |
| 5,651,606 | A | 7/1997 | Krogman |
| D383,138 | S | 9/1997 | Harada |
| D407,707 | S | 4/1999 | Jones |
| 5,964,522 | A | 10/1999 | Schaefer et al. |
| 5,988,833 | A | 11/1999 | Giese et al. |
| 6,160,703 | A | 12/2000 | Lopez |
| 6,483,470 | B1 * | 11/2002 | Hohnstein et al. ........... 343/721 |
| 6,586,671 | B1 | 7/2003 | Kelley et al. |
| D486,146 | S | 2/2004 | Dearnley |
| 6,999,042 | B2 * | 2/2006 | Dearnley et al. ............ 343/890 |
| D595,700 | S | 7/2009 | Cook et al. |
| 7,765,770 | B2 | 8/2010 | Fournier |
| 7,874,126 | B2 | 1/2011 | Fournier |
| 8,203,501 | B2 | 6/2012 | Kim |
| D666,583 | S | 9/2012 | Le et al. |
| 8,564,497 | B1 * | 10/2013 | Dickie et al. ................. 343/872 |
| 9,363,861 | B2 * | 6/2016 | Chalmers et al. ..... H05B 37/02 315/34 |
| 9,631,795 | B2 * | 4/2017 | Gordin et al. .......... F21V 14/04 362/431 |
| 9,837,698 | B2 * | 12/2017 | Lasier et al. ......... H01Q 1/1207 362/431 |
| 2011/0101184 | A1 * | 5/2011 | Kirby et al. ................ 248/218.4 |
| 2014/0266943 | A1 | 9/2014 | Thomson et al. |

OTHER PUBLICATIONS

Commscope, Inc., Assembly Drawing, Concealed Radome, 2 RAD 9 RRU OVP, SSC-760215913, Sep. 1, 2015.

Commscope, Inc., Steel Products—4G and LTE Solutions for Mounting, 2012.

* cited by examiner

View A-A

Detail B (Correct)

(Wrong)

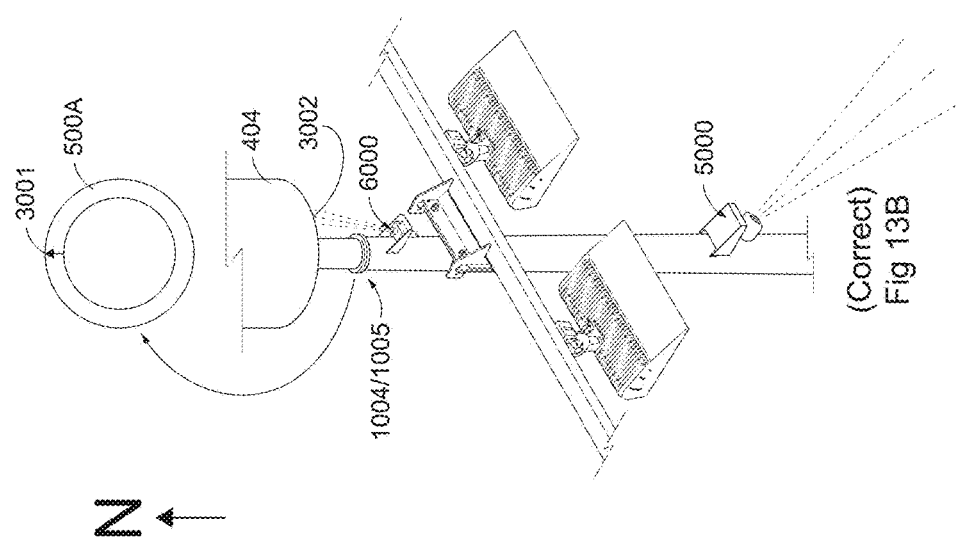
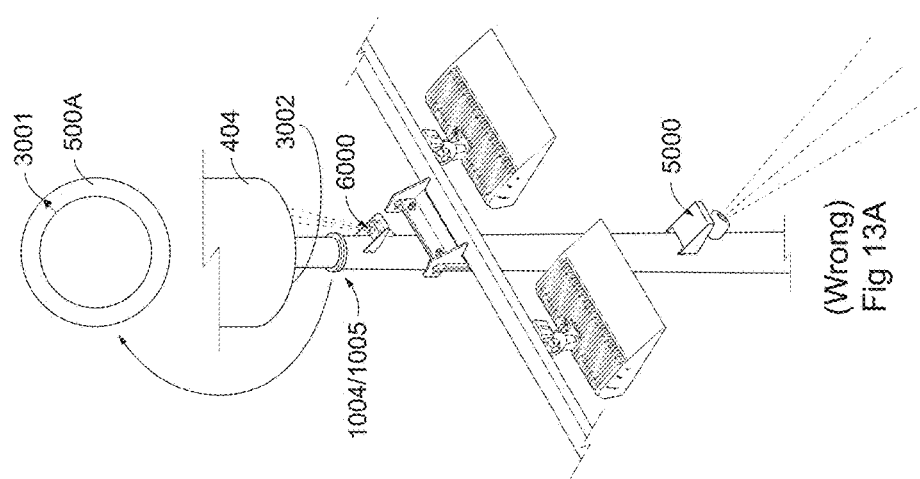

APPARATUS, METHOD, AND SYSTEM FOR FACTORY WIRING AND/OR AIMING OF DEVICES ON DUAL PURPOSE MONOPOLES

CROSS-REFERENCE TO RELATED APPLICATIONS

This application claims priority under 35 U.S.C. § 119 to provisional U.S. application Ser. No. 62/217,619, filed September 11, 2015, hereby incorporated by reference in its entirety.

I. BACKGROUND OF THE INVENTION

The present invention generally relates to factory wiring and/or aiming of devices which are elevated many feet (e.g., 30+ feet) in the air so to reduce labor-intensive onsite aiming. More specifically, the present invention relates to streamlining the assembly and aiming of disparate devices (e.g., lighting fixtures, mobile network antennas, microwave dishes) on a common elevating structure (e.g., pole); namely, by co-locating devices relative a common feature.

It is well known that cellular service providers and wireless internet providers (hereinafter referred to both generically and collectively as "mobile network service providers") have a number of devices (e.g., radios, antennas, filters) that are required to maintain a mobile network. Each mobile network device—as they are generically referred to herein—has its own requirements for correct operation. That being said, each mobile network device requirement may differ from that of some other mobile network device—such that each device has historically been built, shipped, assembled, and aimed separately. Take, for example, a mobile network in which a mobile phone operates. A mobile network service provider will typically have a number of geographically dispersed base stations to which a mobile phone may communicate via air link. Each base station typically includes a number of transceivers (often installed in a ground-mounted cabinet or other enclosure), a number of antennas (often spaced equidistantly about the perimeter of some feature at the top of a tower or pole) and/or radios, and some form of communication line (e.g., coaxial cable, fiber optic) running from the transceivers to the antennas. Said mobile phone network will also typically include a mobile switch (e.g., to track SIM information, connect to toll stations for land line calls, etc.) and some kind of backhaul communication between each base station and the mobile switch. In some instances the backhaul may comprise a hard line (e.g., fiber optic); in other instances, microwave devices may also need to be installed at or near the top of a tower or pole for wireless communications to the mobile switch. This, of course, is a simplification of a very complex system—and ignores any specialty devices such as filters which may be required to prevent interference with wireless communications from other industries (e.g., aeronautics) or to prevent interference from frequency re-use—but it is a suitable description for purposes of the invention.

In the above example of a mobile phone network, the antennas may comprise one or more omnidirectional antennas which may only require high, relatively unencumbered mounting. Alternatively, in the above example the antennas may comprise one or more flat panel antennas; these antennas may require not only high mounting, but relatively precise aiming (e.g., within 1-3° of a desired direction) to ensure adequate signal propagation and coverage (e.g., to build the "mesh" of a network). Yet, other mobile network devices on the same tower or pole may have different requirements for correct operation. For example, said microwave devices often require line-of-sight (which may or may not be at a very high mounting height) with other microwave devices on other poles—thereby creating a "chain" of communication rather than the aforementioned "mesh" associated with the antennas—and very precise aiming (e.g., less than 1° deviation from a desired direction) to ensure point-to-point communications along the backhaul. Even ignoring concerns from the general public regarding exposure to radio frequencies (RF) and requirements from other industries (e.g., the aforementioned filtering of signals), it is readily apparent that (i) mobile network service providers take particular care when selecting sites for erecting elevating structures such as towers or poles, and (ii) the installation of mobile network devices is a laborious procedure.

As with most industries, there are efforts to reduce cost and add value to a mobile network endeavor. Often, mobile network service providers rely on pre-existing elevating structures for the installation of mobile network devices; zoning, construction, and material cost are often substantially resolved issues. That being said, regardless of whether the elevating structure is a new build or a repurposed pre-existing structure, the aforementioned requirements for mobile network devices remain the same. For example, a cellular company may lease a pre-existing tower in a farm field accessible by a public road—and that may save the cost of erecting a new tower, or navigating zoning restrictions, or concerns with RF exposure, and the like—but the cellular company will still need to install a base station enclosure, install one or more mobile network devices on the tower, and meticulously aim each device so to ensure integrity of the mobile network. In such instances, the preexisting elevating structure does nothing to reduce the time, difficulty, or cost of installing mobile network devices. Yet, there remains a desire in the art for mobile network service providers to continue to partner with outside entities (e.g., municipalities, farmers) to grow and strengthen their mobile networks. The art is lacking in tools by which these unrelated entities could provide additional value to the overall process of installing a base station or other component of a mobile network; particularly, with respect to what has been identified as a costly bottleneck in the overall process. Thus, there is room for improvement in the art.

II. SUMMARY OF THE INVENTION

Mobile network service providers often rely upon unrelated or outside entities to provide preexisting structures to which their mobile network devices can be added; the unrelated/outside entities gain the benefit of boosted signal strength, and the service provider gains a stronger network. That being said, more can be done to add value to this partnership. In the state of the art, mobile network service providers must rely upon multiple technicians at multiple sites relying upon technology such as global positioning systems, spectrum analyzers, and the like to not only pinpoint where a tower or pole exists, but the precise horizontal and vertical aiming of each mobile network device when mounted at a particular position on said tower or pole, as well as polarity and other characteristics relating to the signals transmitted/received by each of said mobile network devices. Thus, while it is readily apparent that creating or growing a mobile network will likely always rely heavily upon manpower and onsite commissioning, mobile network service providers may benefit from partnering with entities which already possess expertise in the art of precisely aiming elevated devices.

There are benefits of a mobile network service provider partnering with, specifically, a precision lighting provider; namely, the ability to pre-wire mobile network device assemblies. It is well known in the art of mobile network design that once mobile network devices are installed, a technician must climb the elevating structure and connect all wiring, often to a very specific torque via specialized tools. The aforementioned coaxial and fiber optic cables are quite thick (e.g., 1" diameter), unwieldy, and subject to restrictions on the degree to which they can be bent. It is laborious—and difficult—to wire said devices in situ. Ignoring the difficulties of the altitude, a technician must also contend with bright sunlight, high winds, rain, and other environmental factors. It is simply easier to produce—and verify—that wiring has been done correctly in the factory. Yet mobile network service providers continue to rely upon a piecemeal, labor-intensive approach to wiring devices—partly because of exacting requirements, partly because of a lack of factory aiming capability, partly because of the many diverse types and sizes of devices, and partly because there is not an opportunity if elevating structures are pre-existing, for example. The present invention solves, or obviates, all these limitations.

It is therefore a principle object, feature, advantage, or aspect of the present invention to improve over the state of the art and/or address problems, issues, or deficiencies in the art.

Envisioned are means and methods by which factory wiring and aiming techniques associated with precision lighting applications (e.g., sports lighting) may be applied to mobile network devices. The end result is a single monopole, tower, or elevating structure which is dual purposed; providing precise lighting, as well as providing needed infrastructure (and initial aiming) for mobile network devices.

A method according to one aspect of the present invention comprises factory wiring and aiming a lighting fixture assembly, factory wiring and aiming a mobile network device assembly, installing said lighting fixture assembly in a known orientation relative a target area, and installing said mobile network device assembly on the same elevating structure as said lighting fixture assembly in a manner that not only provides a known orientation for the mobile network device assembly, but also provides a reference of geographic location in the event said mobile network device assembly or some component thereof requires additional onsite aiming.

An apparatus according to one aspect of the present invention comprises a mating interface associated with said mobile network device assembly having structure for a laser, said laser used to align the mobile network device assembly to a mark or other indicia of a mating interface associated with the lighting fixture assembly.

These and other objects, features, advantages, or aspects of the present invention will become more apparent with reference to the accompanying specification and claims.

III. BRIEF DESCRIPTION OF THE DRAWINGS

From time-to-time in this description reference will be taken to the drawings which are identified by figure number and are summarized below.

Figure 1:
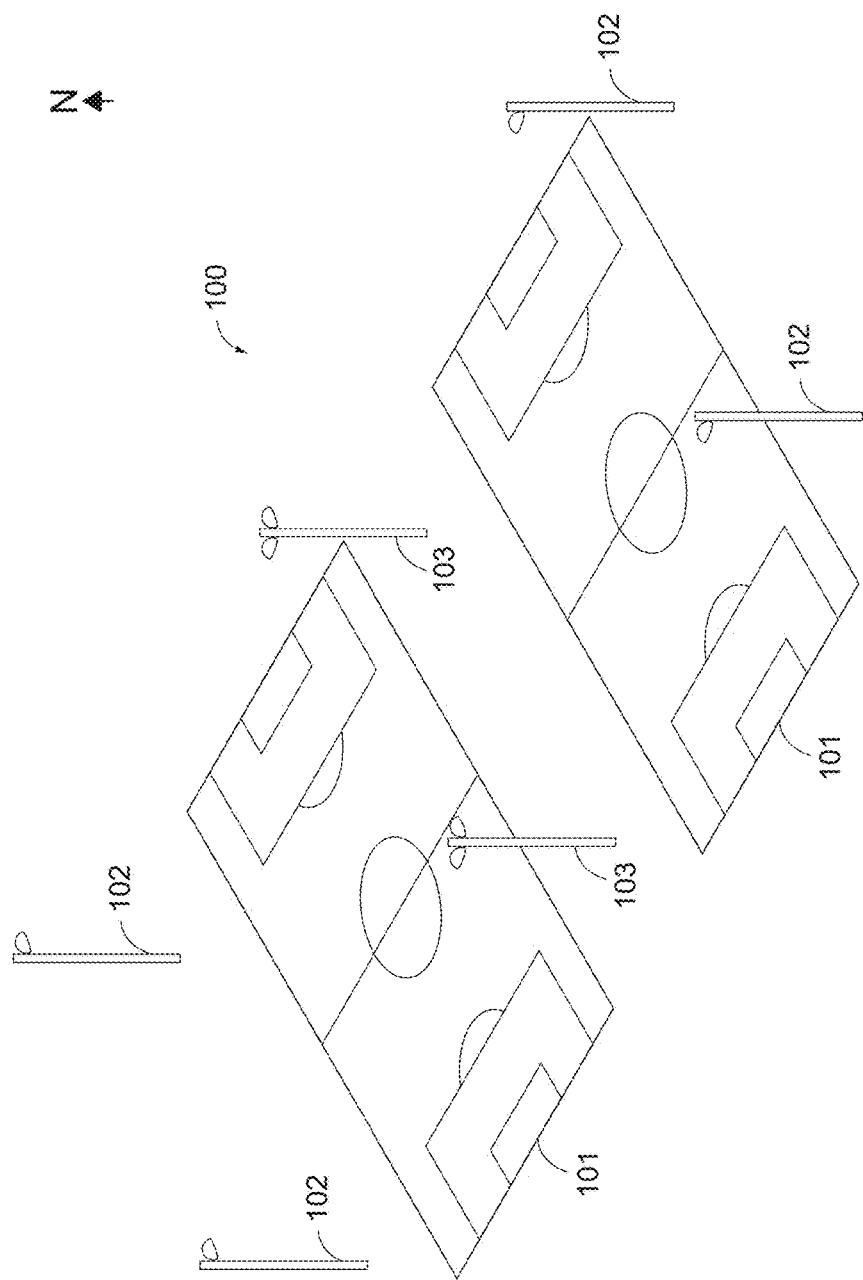
FIG. 1 illustrates a generic sports lighting scenario in which two soccer fields are illuminated by multiple fixtures; geographic orientation and directional position of lighting fixtures are known pursuant to installation.
Figure 2:
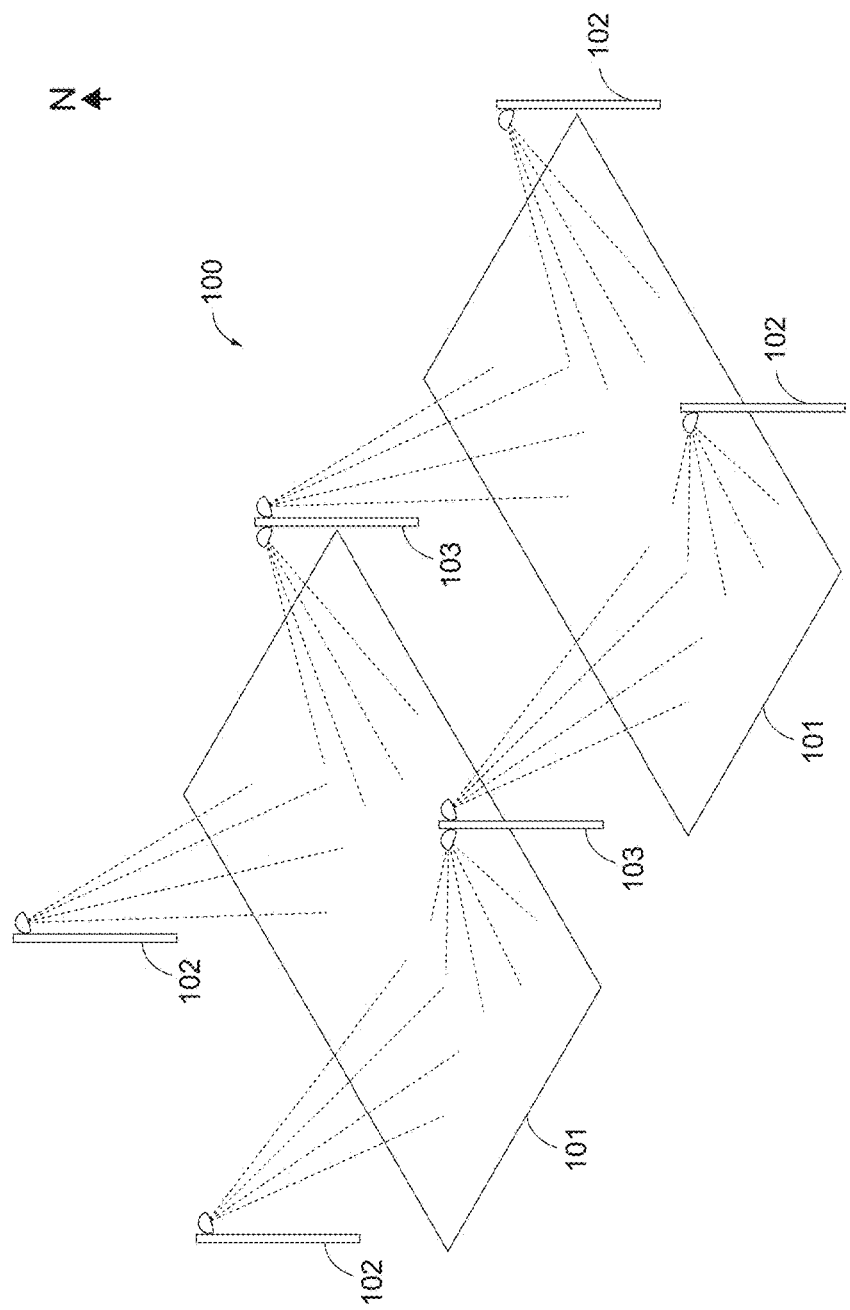
FIG. 2 illustrates the generic sports lighting scenario of FIG. 1 including diagrammatic depictions of light emitted from each oriented lighting fixture so to produce adequate lighting of said soccer fields; note that for clarity, field lines have been removed.
Figures 3A, 3B:
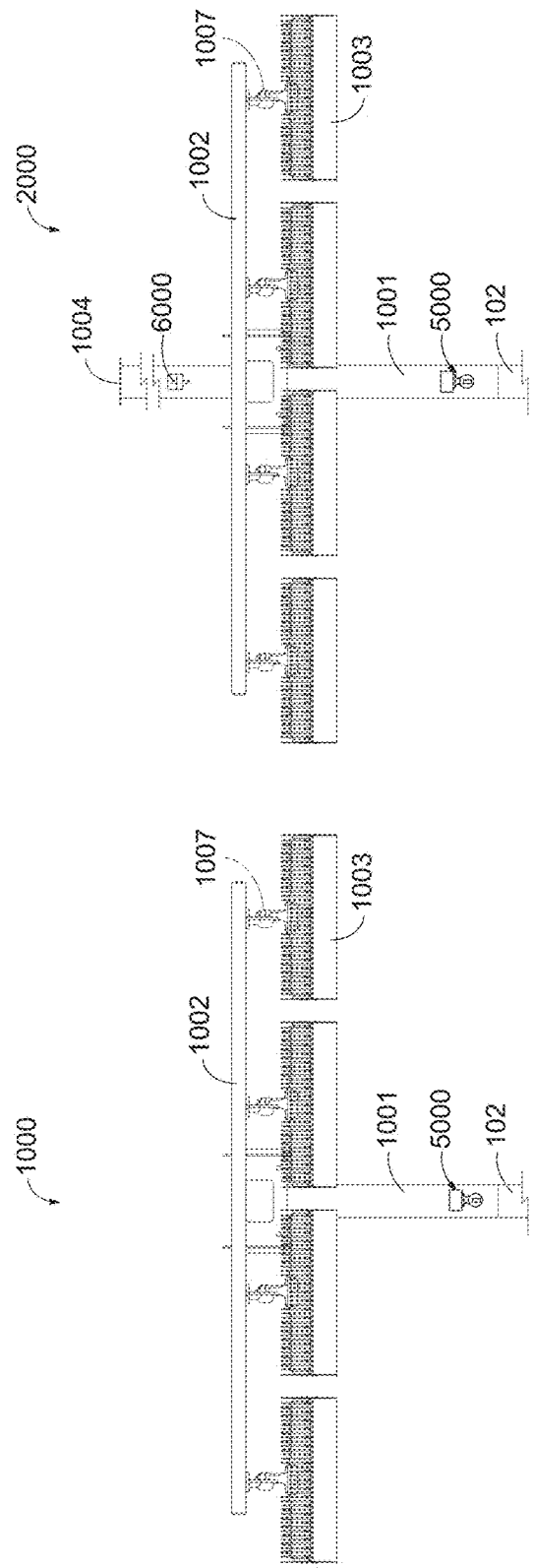
Figure 3D:
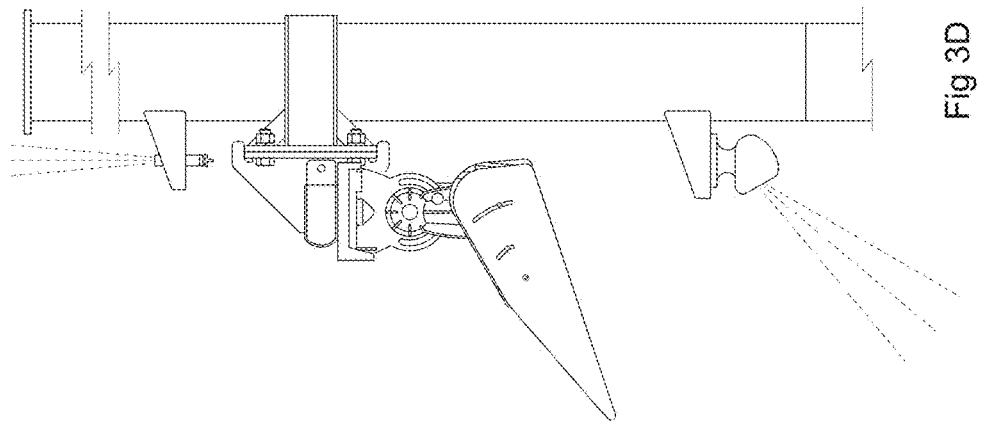
Figure 3C:
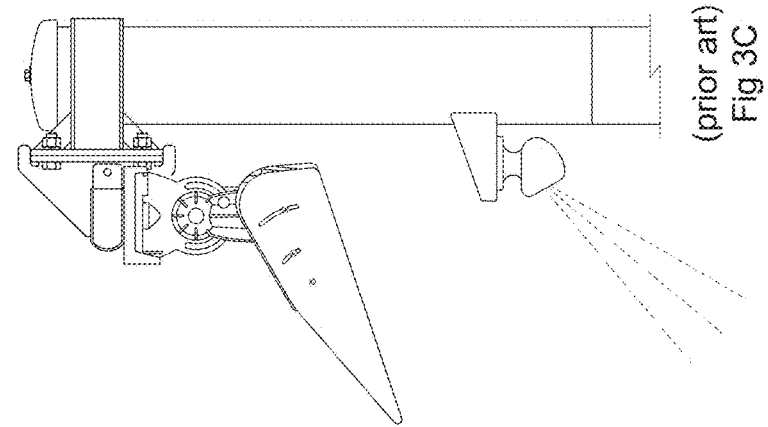

FIG. 3A illustrates a partial front view of a state-of-the-art LED lighting fixture assembly which may be used in the generic sports lighting scenario of FIGS. 1 and 2. FIG. 3B illustrates the LED lighting fixture assembly of FIG. 3A modified according to aspects of the present invention to include a mating interface. FIG. 3C illustrates an enlarged right side view of the state-of-the-art LED lighting fixture assembly of FIG. 3A including diagrammatic depictions of light from a laser assembly associated with the lighting fixture assembly; note that for clarity, all reference numbers have been removed. FIG. 3D illustrates an enlarged right side view of the modified LED lighting fixture assembly of FIG. 3B including diagrammatic depictions of light from a laser assembly associated with the lighting fixture assembly, and further including diagrammatic depictions of light from a laser assembly associated with the mobile network devices according to aspects of the present invention; note that for clarity, all reference numbers have been removed.

Figure 4A:
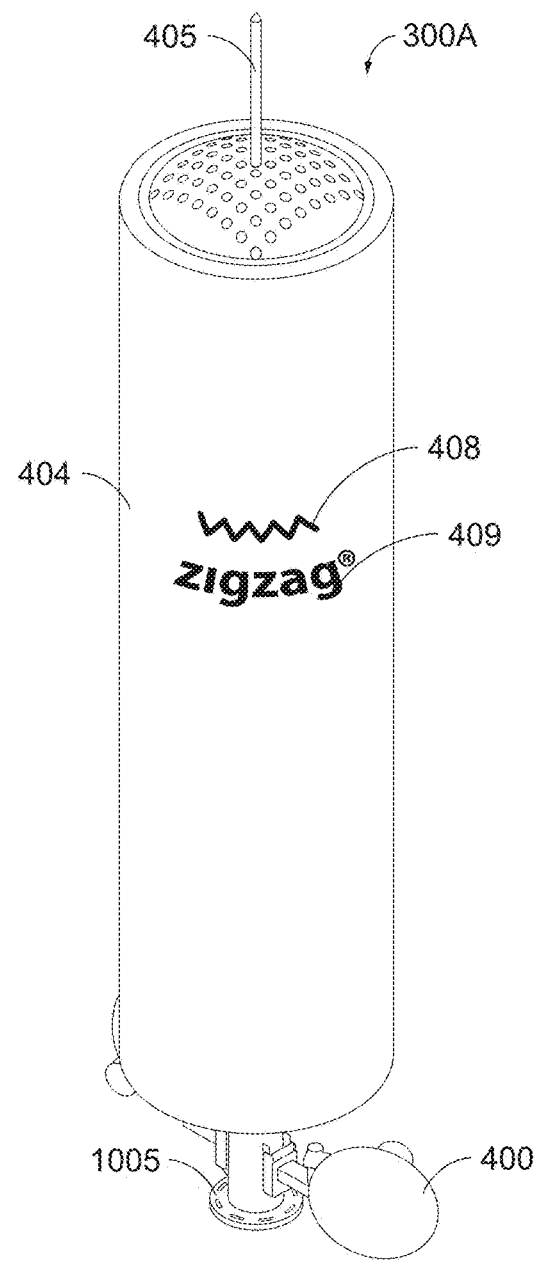
Figure 4B:
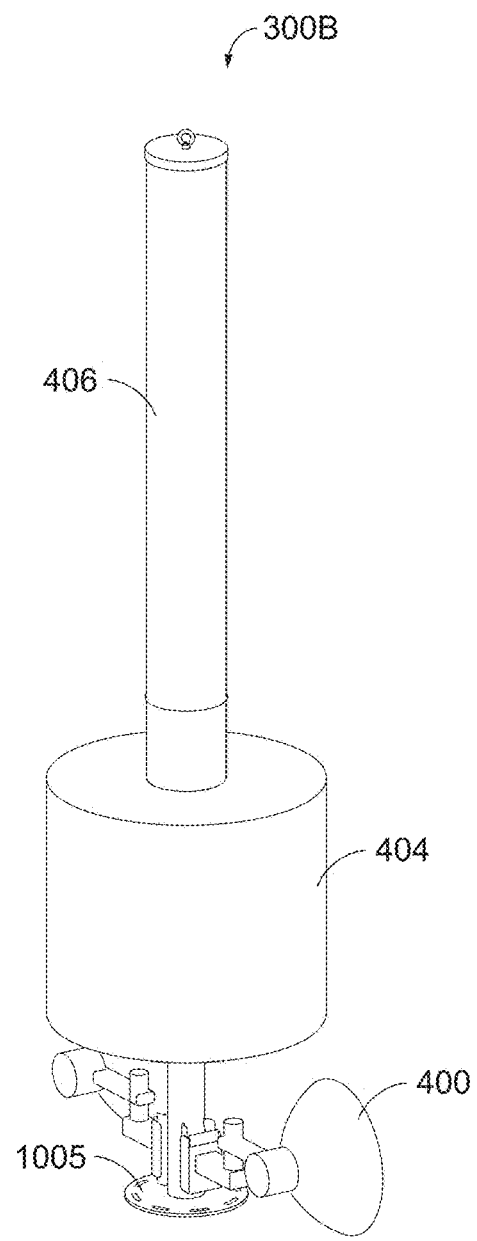
Figure 4C:
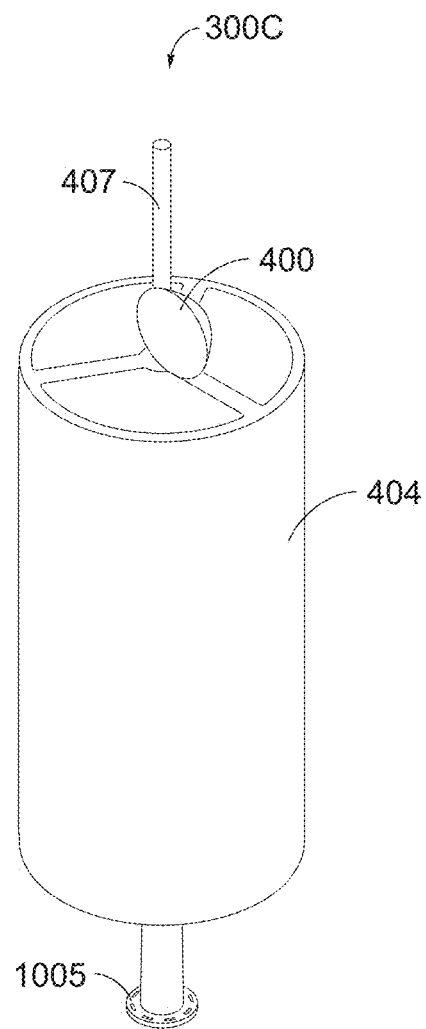

FIG. 4A illustrates a perspective view of a first example of mobile network device assembly adapted to mate with the LED lighting fixture assembly of FIG. 3B or similar lighting fixture assembly. FIG. 4B illustrates a perspective view of an alternative mobile network device assembly which may be used according to aspects of the present invention. FIG. 4C illustrates a still further example, in perspective view, of a possible mobile network device assembly adapted for mating with the lighting fixture assembly of FIG. 3B (or similar lighting fixture assembly) in accordance with aspects of the present invention.

Figure 5A:
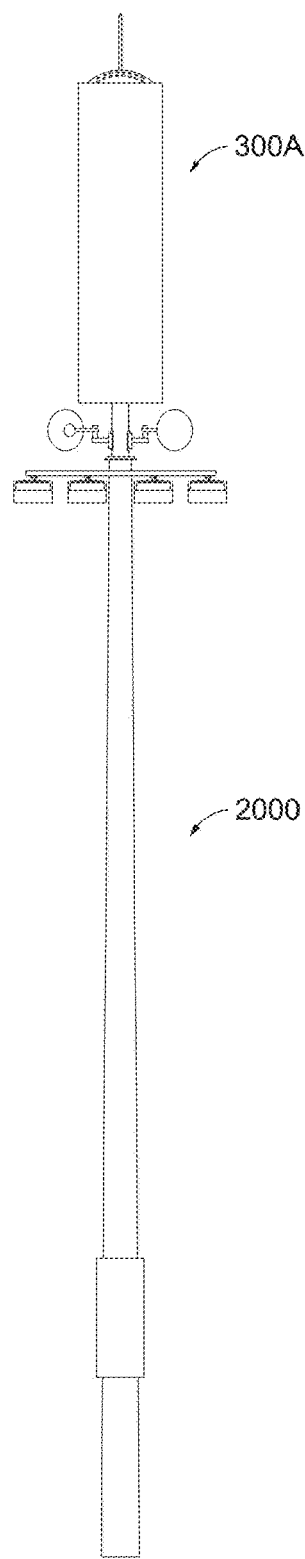
Figure 5B:
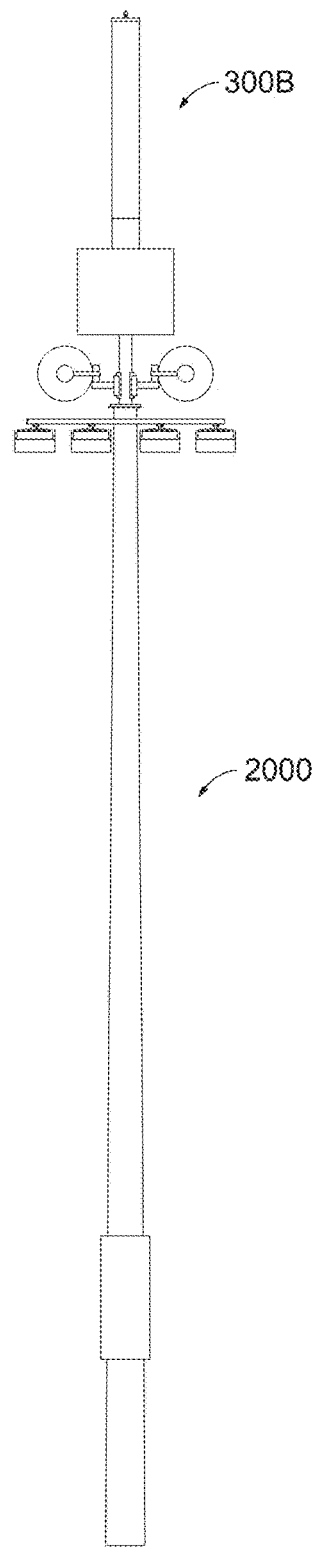
Figure 5C:
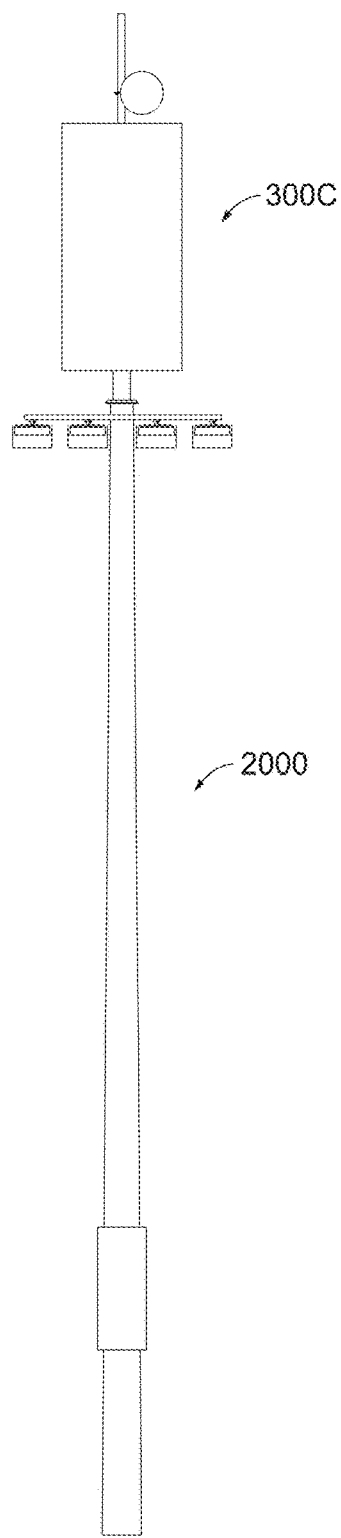

FIG. 5A illustrates a front view of the mobile network device assembly of FIG. 4A as mated with the LED lighting fixture assembly of FIG. 3B; note that for clarity, no laser assemblies are illustrated. FIG. 5B illustrates a front view of the mobile network device assembly of FIG. 4B as mated with the LED lighting fixture assembly of FIG. 3B; note that for clarity, no laser assemblies are illustrated. FIG. 5C illustrates a front view of the mobile network device assembly of FIG. 4C as mated with the LED lighting fixture assembly of 3B; note that for clarity, no laser assemblies are illustrated.

Figure 6:
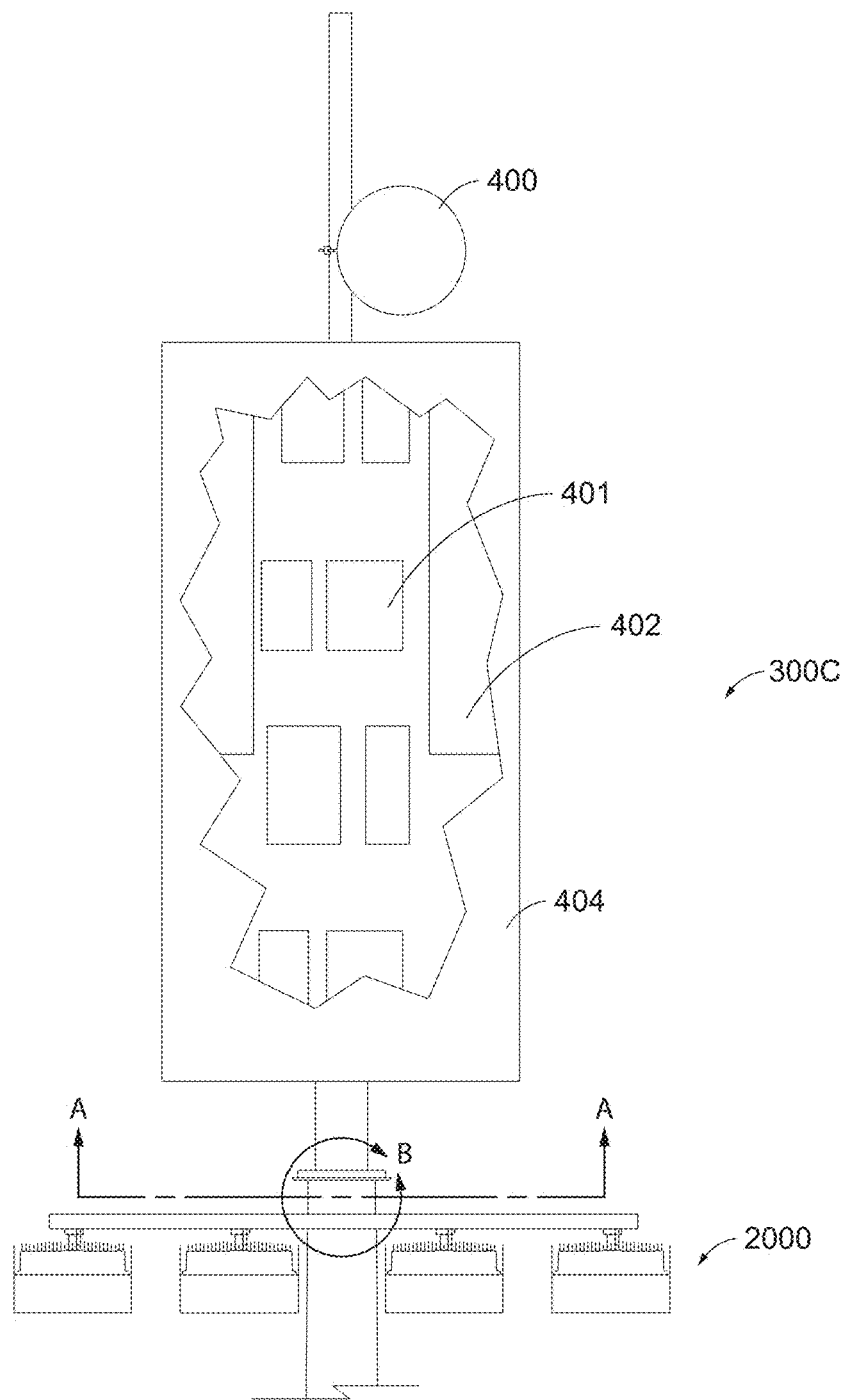

FIG. 6 illustrates an enlarged partial view of FIG. 5C showing in greater details the mating interfaces of both the mobile network device and LED lighting fixture assemblies, as well as limited details of the internal components of the mobile network device assembly via cutaway; note that for clarity, no laser assemblies are illustrated.

Figure 7:
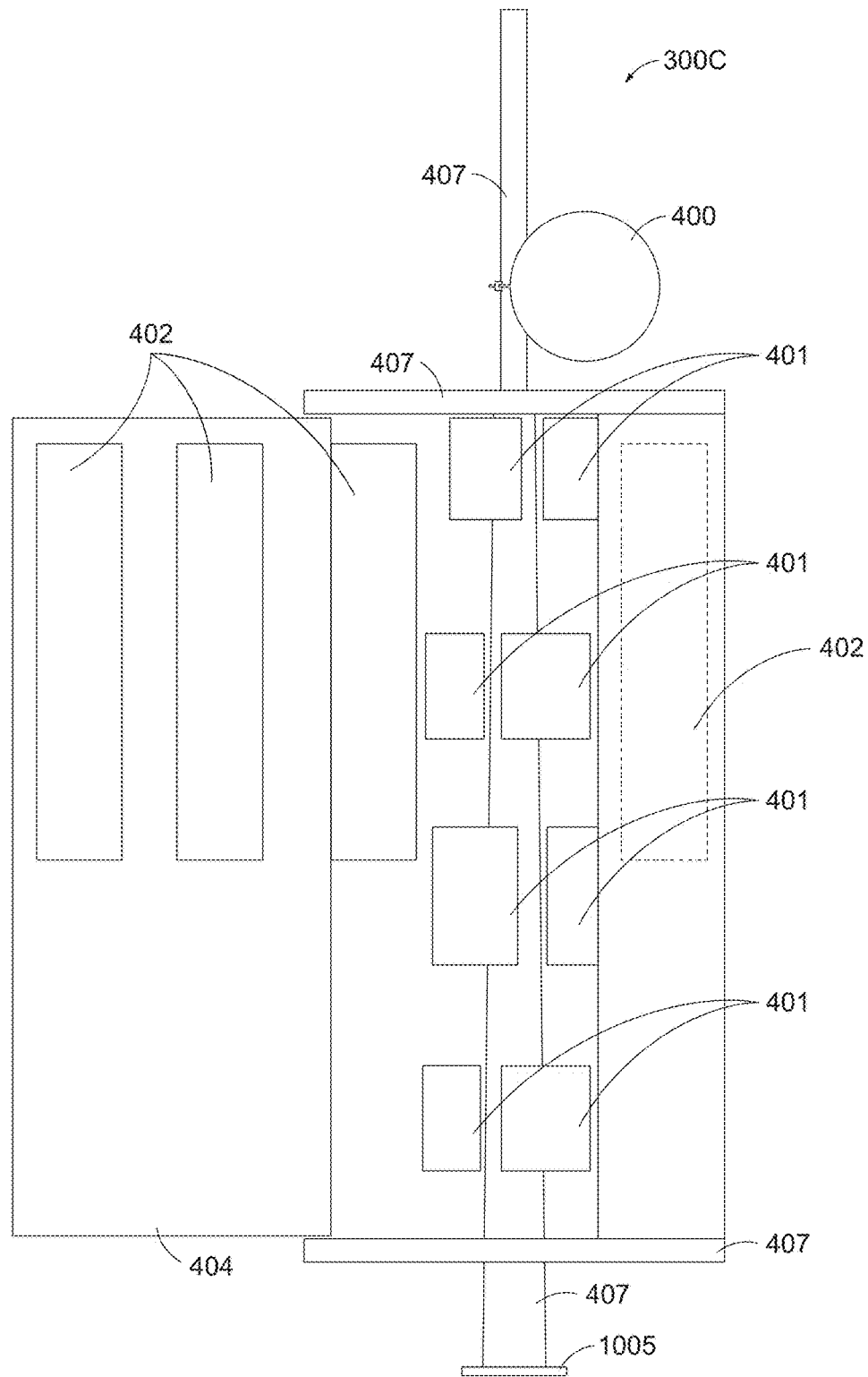

FIG. 7 illustrates a further enlarged view of the mobile network device assembly of FIG. 6 showing additional details of the internal components of the mobile network device; in this example, by opening the canister of the mobile network device assembly.

Figure 8:
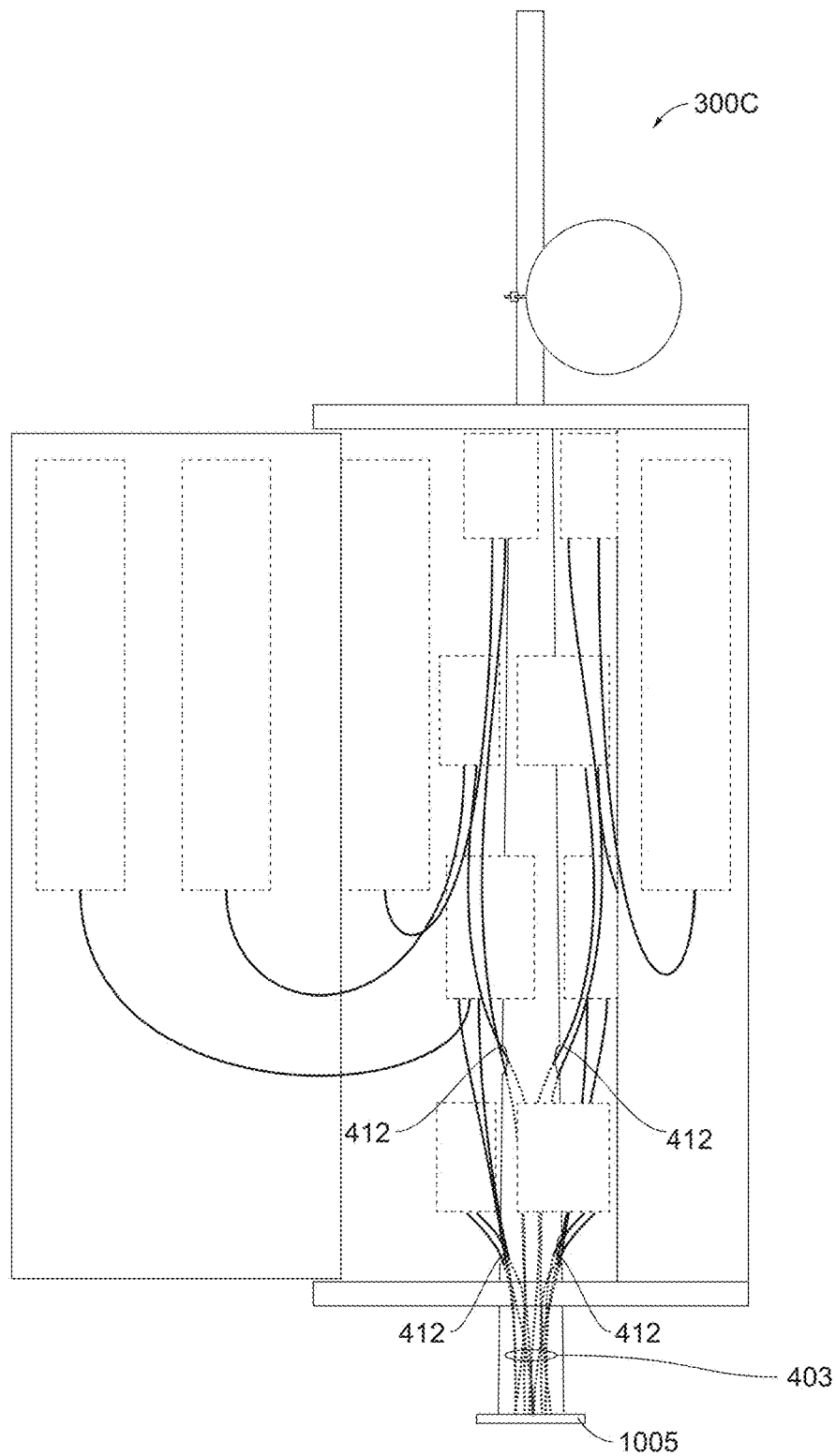

FIG. 8 illustrates the enlarged and opened view of FIG. 7 including power and/or other wiring routed into the interior of a pole section via handholes; note that for clarity, all other internal components of the mobile network device assembly have been placed in broken line.

Figure 9A:
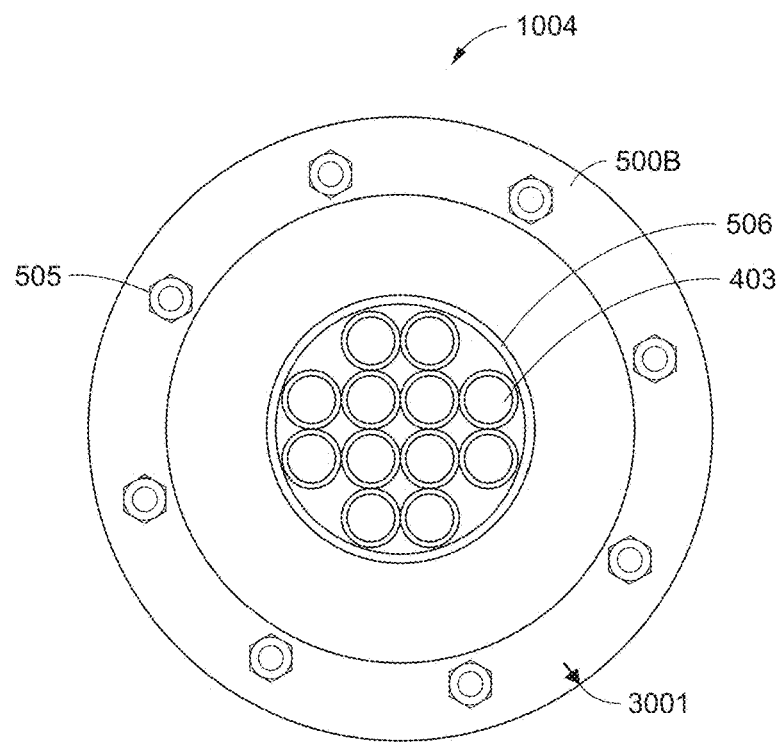
Figure 9B:
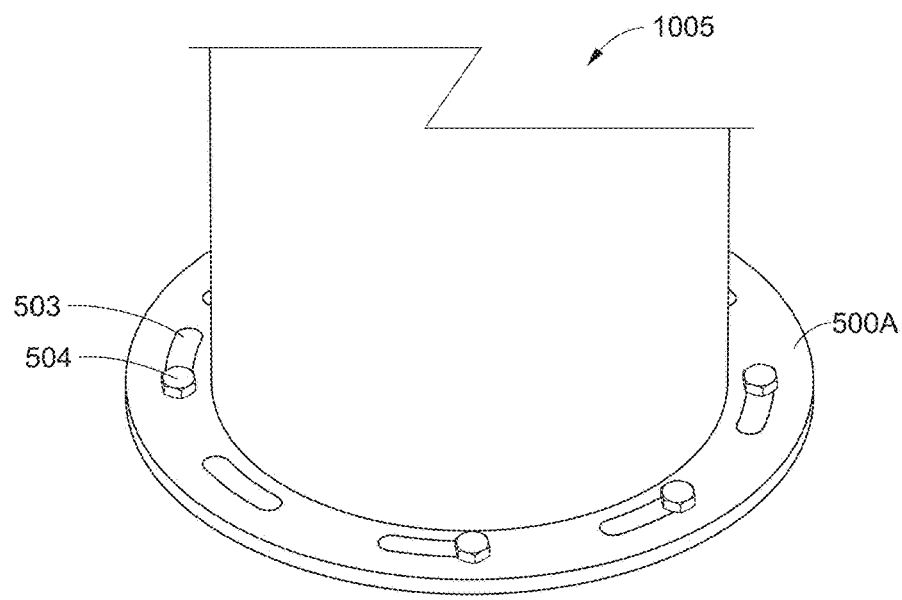
Figure 9C:
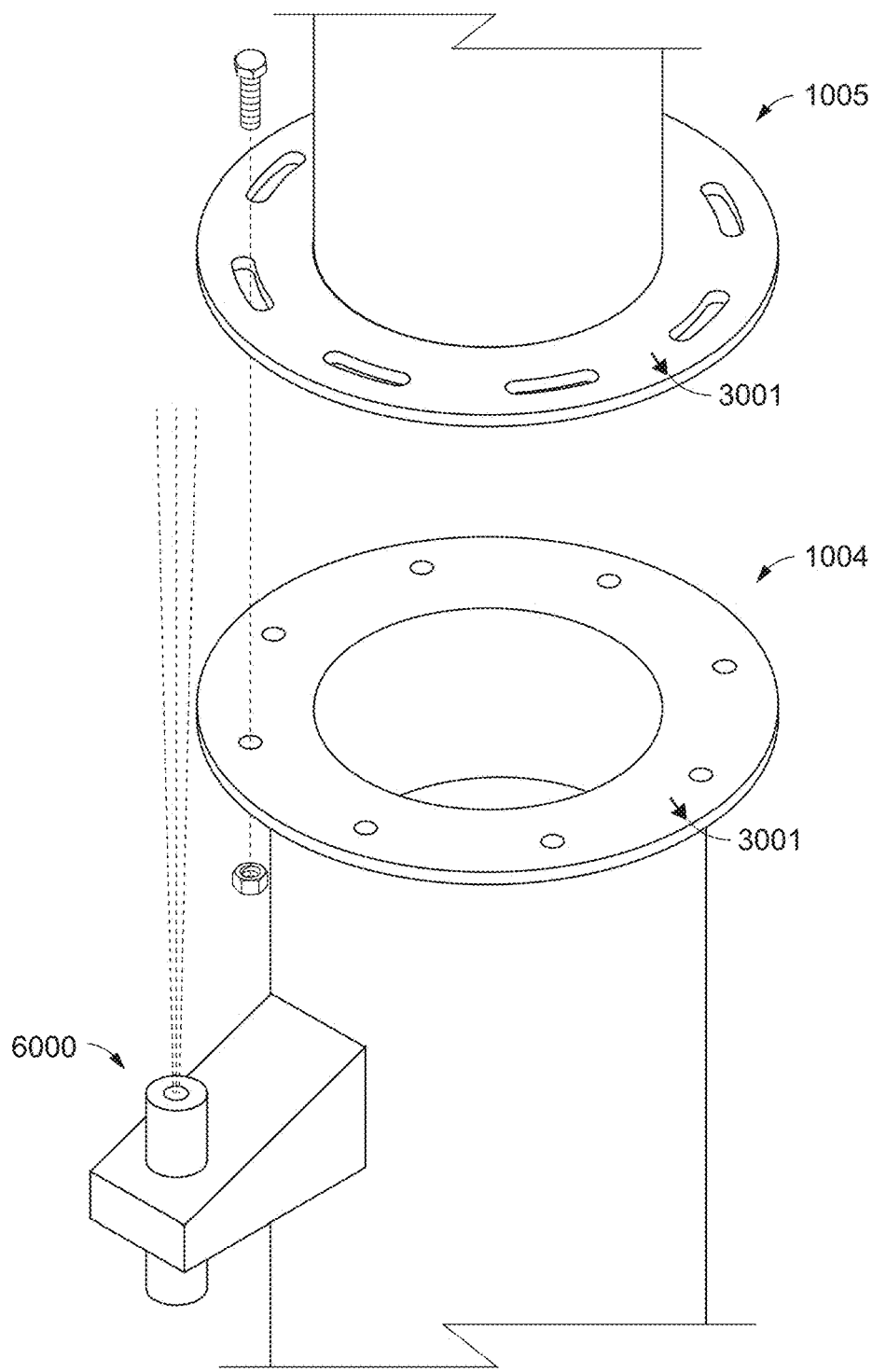

FIG. 9A illustrates an isolated view of one portion of the mating interface of the mobile network device assemblies of FIGS. 4A, B, or C such as might be seen along view line A-A of FIG. 6 (i.e., looking up from the ground towards mating interface portion 1004). FIG. 9B illustrates an isolated front perspective view of one portion of the mating interface of the mobile network device assemblies of FIGS. 4A, B, or C such as might be seen looking downwardly towards mating interface portion 1005. FIG. 9C illustrates an exploded perspective view of mating interfaces 1004 and 1005 so to illustrate general orientation; one possible location and orientation of laser assembly 6000 is also illustrated.

Figure 10:
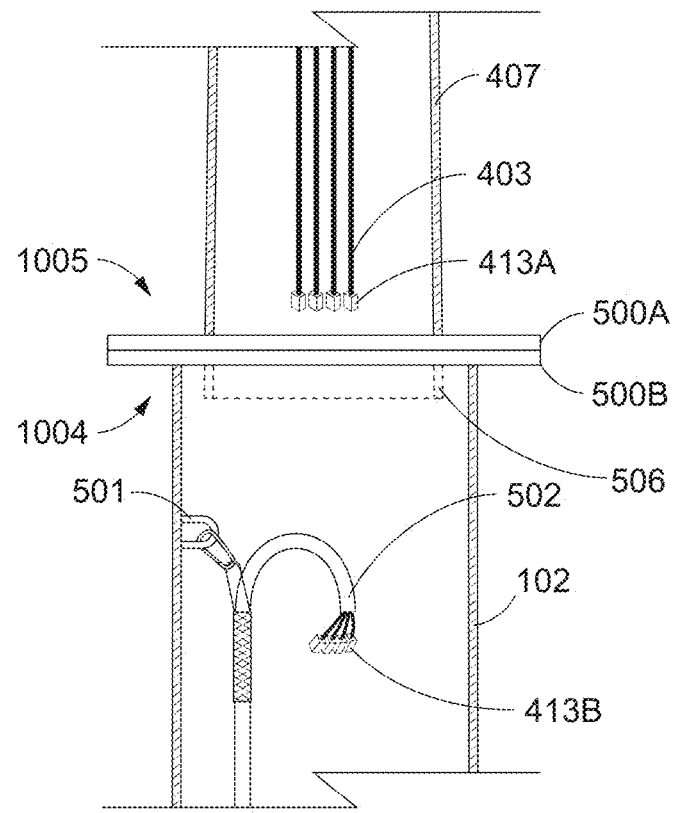

FIG. 10 illustrates an isolated section view of the mating interfaces of both the mobile network device and LED lighting fixture assemblies such as might be seen in Detail B of FIG. 6, and further illustrating quick connectors associated with the wiring; note that for clarity, no laser assemblies are illustrated.

Figure 11:
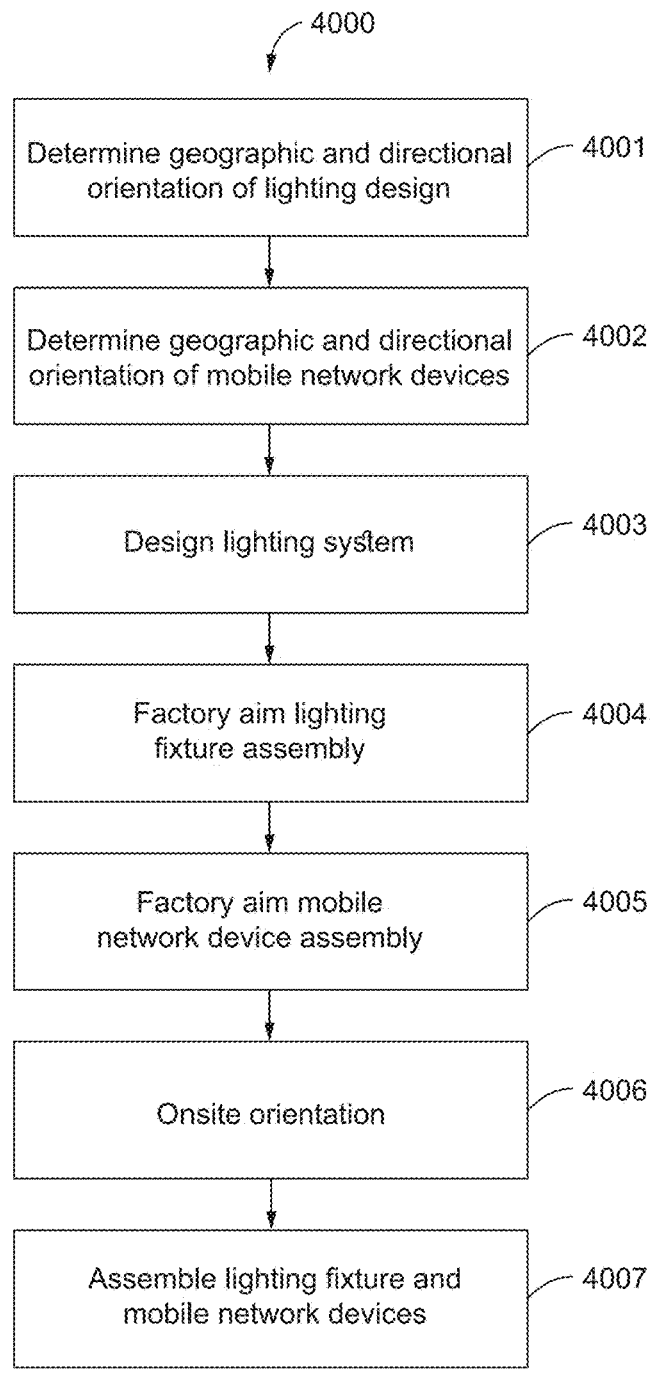

FIG. 11 illustrates one possible method of practicing aspects according to the present invention.

Figure 12B:
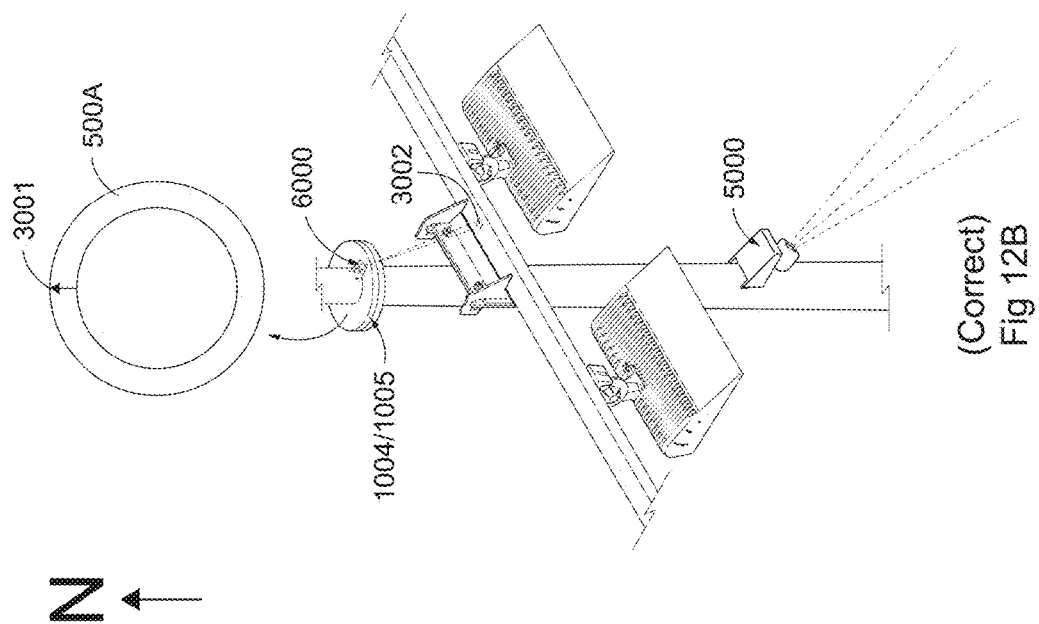
Figure 12A:
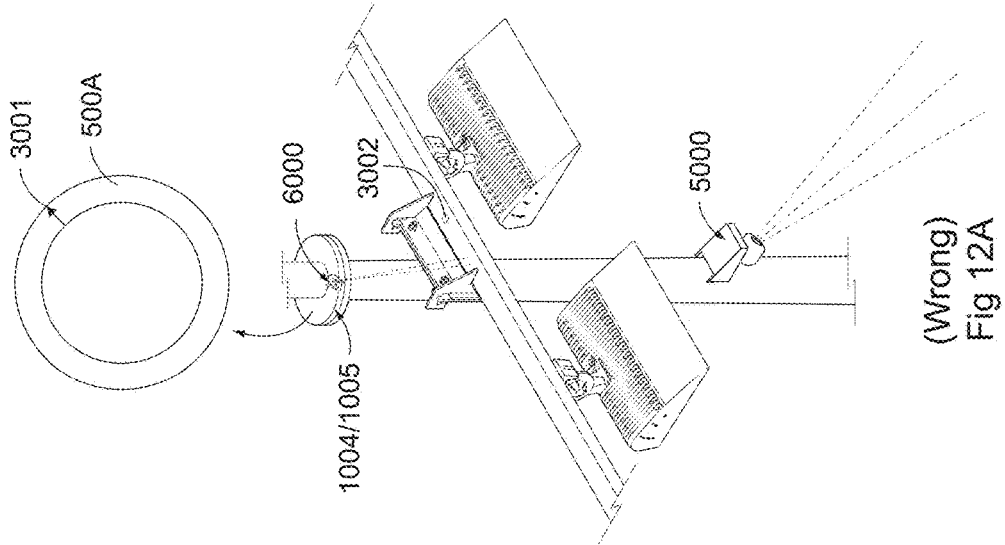

FIGS. 12A and 12B illustrate implementation of the method of FIG. 11 with respect to one particular laser assembly orientation (i.e., shooting downwardly); note that for clarity, a number of features of mating interface 1004/1005 have been removed. FIG. 12A illustrates a mobile network device assembly in an incorrect orientation (note indicia 3001 does not coincide with the illustrated cardinal direction), whereas FIG. 12B illustrates the mobile network device assembly in a correct orientation (e.g., after rotation of the mobile network device assembly approximately 45° counterclockwise so diagrammatic depiction of light emitted from laser assembly 6000 strikes reflective indicia 3002).

FIGS. 13A and 13B illustrate implementation of the method of FIG. 11 with respect to a different laser assembly orientation than that of FIGS. 12A and B (i.e., shooting upwardly); note that for clarity, a number of features of mating interface 1004/1005 have been removed. FIG. 13A illustrates a mobile network device assembly in an incorrect orientation (note indicia 3001 does not coincide with the illustrated cardinal direction), whereas FIG. 13B illustrates the mobile network device assembly in a correct orientation (e.g., after rotation of the mobile network device assembly approximately 45° counterclockwise so diagrammatic depiction of light emitted from laser assembly 6000 strikes reflective indicia 3002 (on the underside of canister 404—not shown)).

Figure 14:
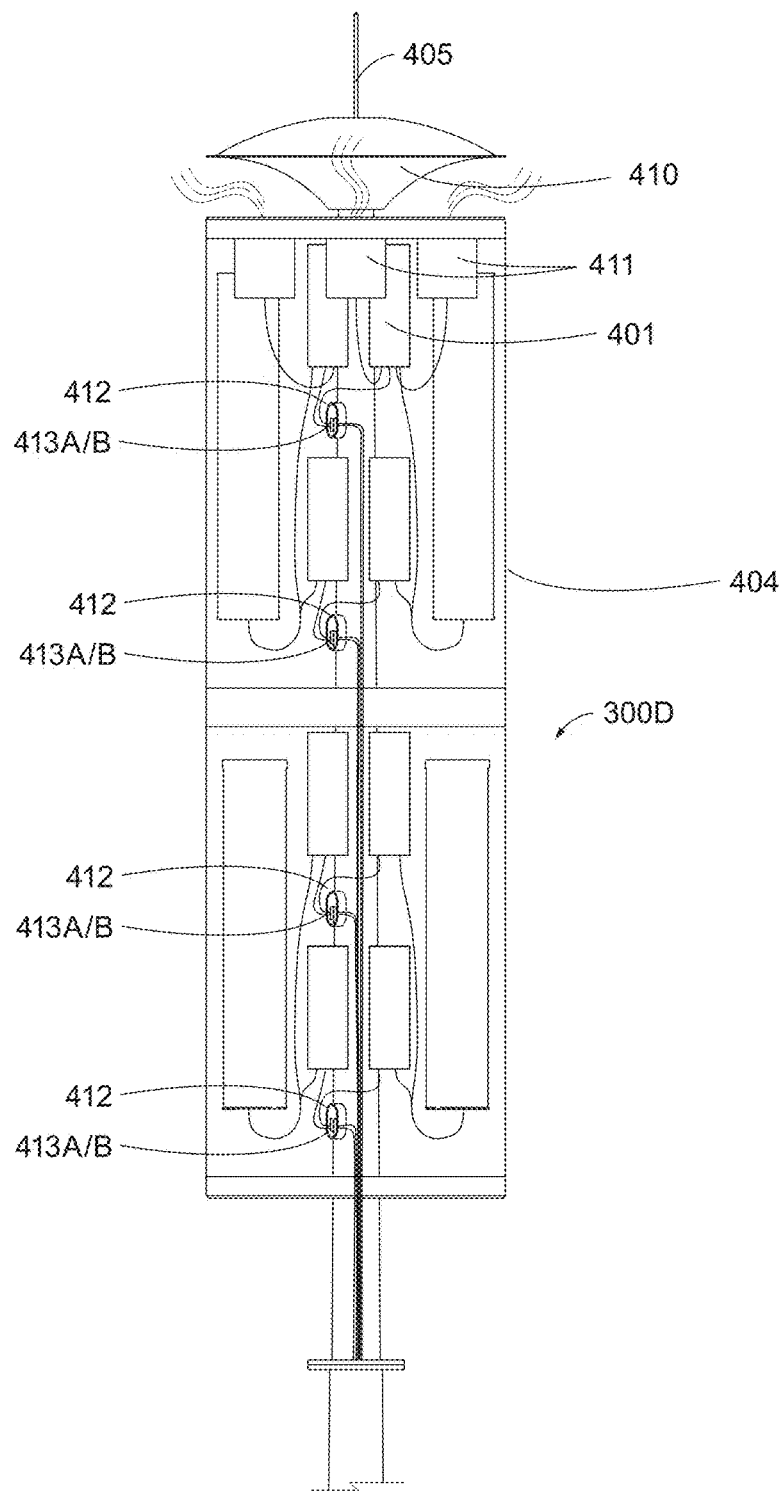

FIG. 14 illustrates a still further alternative mobile network device assembly adapted to mate with the LED lighting fixture assembly of FIG. 3B or similar lighting fixture assembly; here including fans to provide cooling of mobile network devices and further including the handholes of FIG. 8 and the quick connectors of FIG. 10. For clarity, no hatching or section lines have been included.

Figure 15:
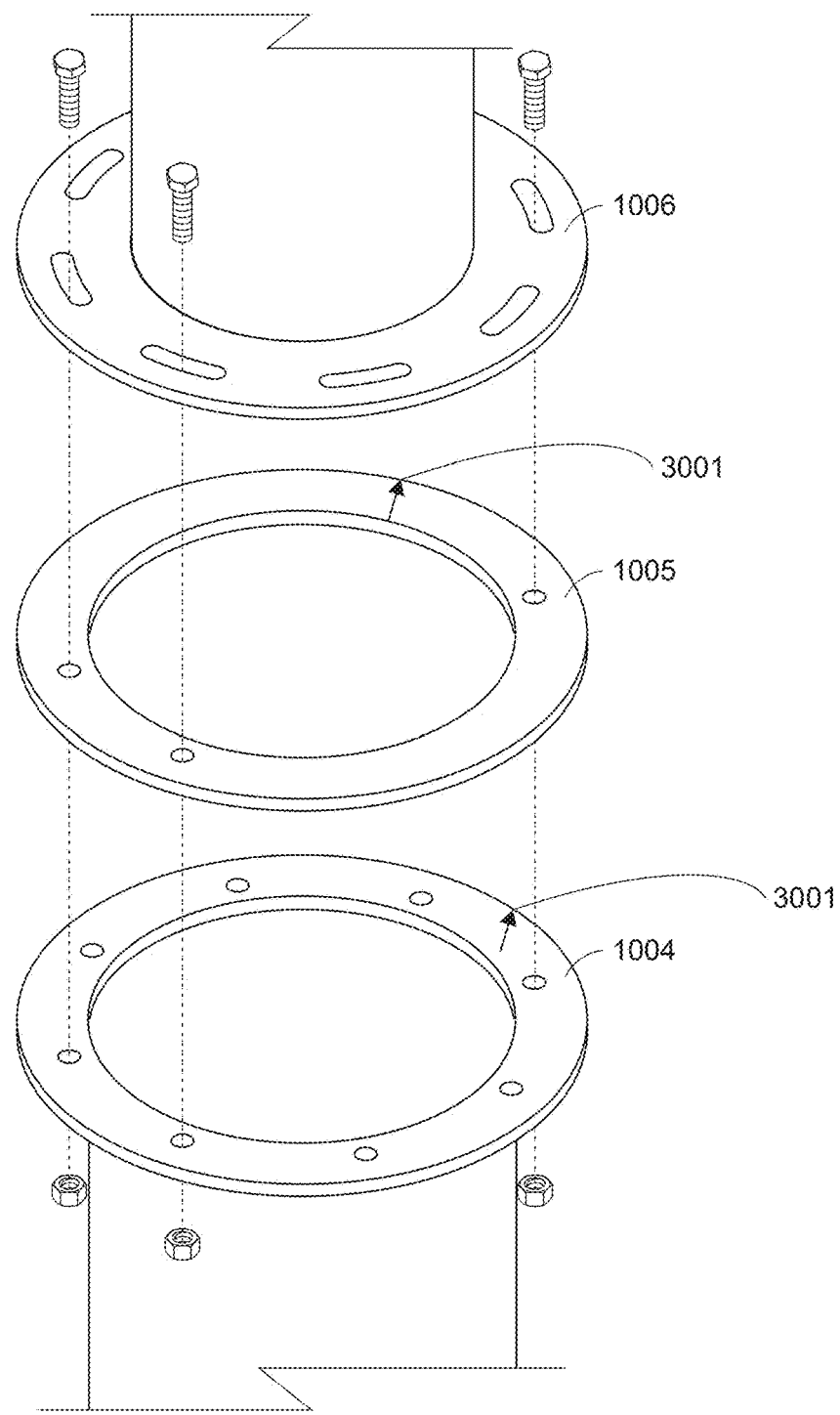

FIG. 15 illustrates a possible alternative to mating lighting fixture and mobile network device assemblies; here including a third mating plate which prevents the mobile network device assembly from being bolted down in an incorrect orientation.

Figure 16A:
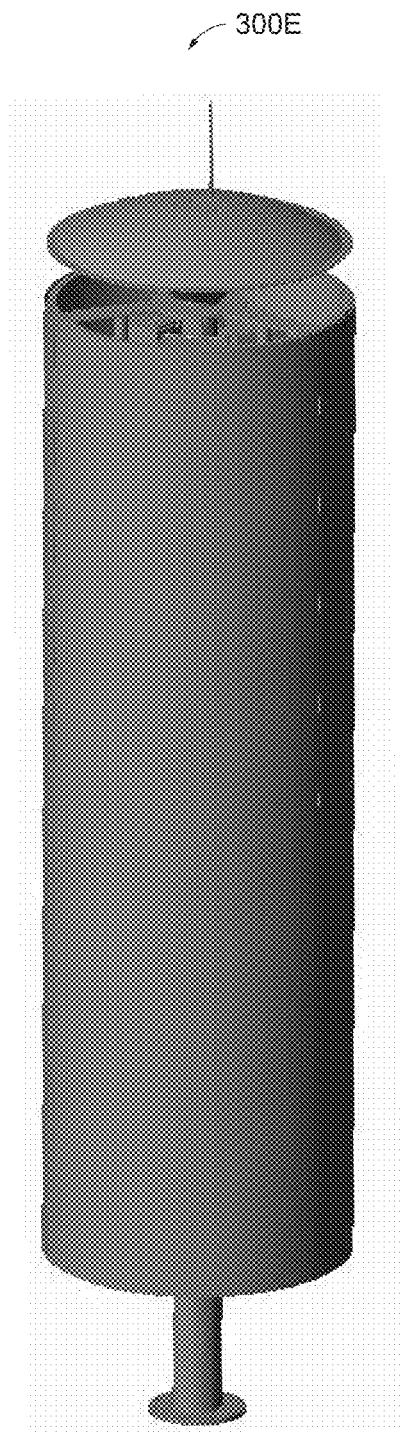
Figure 16B:
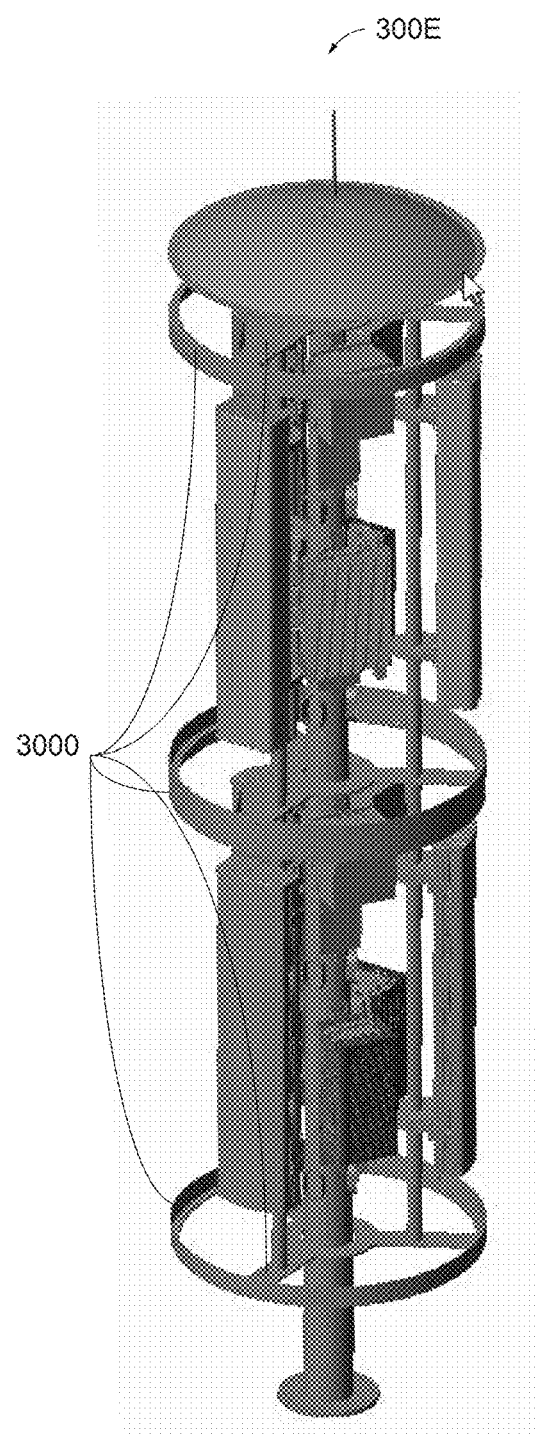

FIGS. 16A and B illustrate a still further alternative mobile network device assembly adapted to mate with the LED lighting fixture assembly of FIG. 3B or similar lighting fixture assembly; here including a frame or infrastructure (FIG. 16B) to which devices may be mounted and around which a sheet-like canister material may be stretched (FIG. 16A).

IV. DETAILED DESCRIPTION OF EXEMPLARY EMBODIMENTS

A. Overview

To further an understanding of the present invention, specific exemplary embodiments according to the present invention will be described in detail. Frequent mention will be made in this description to the drawings. Reference numbers will be used to indicate certain parts in the drawings. Unless otherwise stated, the same reference numbers will be used to indicate the same parts throughout the drawings.

Regarding terminology, reference is given herein to both geographic orientation and directional position of devices. As used herein geographic orientation refers to locating, or the location of, an object relative another object or feature (e.g., pole, field, building, tree, etc.); it also refers to orientation at a local level. Directional position refers to locating, or the location of, an object relative a cardinal direction (e.g., North, South, East, West); it also refers to orientation at a global level. Further, when reference is given herein to an absolute cardinal direction, said direction is capitalized (e.g., North); when reference is given to an orientation using a cardinal direction in the colloquial or as a guideline, said direction is not capitalized (e.g., north). So, for example, a sentence herein may read: "Part X is rotated 3° in a clockwise or generally northern direction from its starting position such that it points North after rotation." While it is important to note these subtleties in the specific examples set forth, said examples should not in any way be considered limiting in terms of the overall invention.

Further regarding terminology, the terms "lighting fixtures" and "luminaires" are used interchangeably herein; this is for convenience, and in no way imparts a limitation on the components of a lighting system designed in accordance with aspects of the present invention. For example, use of the term "fixture" in lieu of "luminaire" is not intended to suggest power regulating components, power wiring, and the like are omitted from the lighting design. Lastly, reference is given herein to "mobile network service providers" and "lighting designers"; neither of these terms is intended to purport limitations on who may practice the invention, own apparatus used in the invention, or the like.

The exemplary embodiments envision means and methods by which mobile network device assemblies of varying composition, design, and structure may be mated, joined, or otherwise affixed or coupled to lighting fixture assemblies of varying composition, design, and structure. It is to be understood that the examples set forth herein are purely illustrative and are not intended to limit the invention in any way, nor are they intended to reflect any preferred or particular structure or approach to lighting design.

FIG. 1 illustrates a generic sports lighting scenario 100 in which multiple lighting fixtures are mounted on poles 102 and oriented so to illuminate a sports field 101; in this example, two soccer fields. Depending on time, cost, and space restrictions, for example, some poles 103 may need to be designed to illuminate both fields 101 simultaneously; in this example, by luminaires mounted on opposing sides of the pole. A diagrammatic depiction of how fixtures on poles 102 and 103 illuminate fields 101 is illustrated in FIG. 2; note that for clarity all field lines have been removed. What FIGS. 1 and 2 are intended to illustrate is twofold: that (i) sports lighting is a precision lighting application insomuch that each luminaire must be precisely aimed so the system as a whole satisfies the sometimes rigorous lighting requirements (e.g., as dictated by governing bodies, dark sky associations, municipalities), and (ii) both geographic orientation and directional position are known or determined during the course of completing a lighting design and installing a suitable finished product. Principles of precisely aiming lighting fixtures mounted on a pole so to satisfy lighting requirements are described in greater detail in U.S. Pat. No. 7,500,764, incorporated by reference herein in its entirety.

A detailed look at what exists at the top of pole 102 in a typical lighting system is illustrated in FIG. 3A. In this non-limiting prior art example 1000 a fitter portion 1001 is slip-fit onto pole 102, said fitter portion welded, affixed, or otherwise formed to crossarm 1002. Poles may be similar in design to those described in aforementioned U.S. Pat. No. 7,500,764 (or otherwise), and may include a generally hollow base portion such as is described in U.S. Pat. No. 8,163,993 incorporated by reference herein in its entirety. Crossarm 1002, as well as pole 102 and fitter 1001, are generally hollow so to permit power wiring to extend from power regulating devices (e.g., drivers) housed in enclosures at or near the bottom of the pole up to LED lighting fixtures 1003; in this example, via adjustable armatures 1007—which are also substantially hollow—and which may be similar in design to those described in U.S. patent application Ser. No. 12/910,443 or U.S. Pat. No. 8,337,058 both of which are incorporated by reference herein in their entirety, or otherwise. Depending on the particular design of crossarm 1002, armature 1007, and luminaire 1003, in situ adjustability may be permitted about one, two, or three axes. For example, fitter portion 1001 may be pivoted about its position on pole 102 so to adjust all fixtures 1003 about an axis extending along the length of pole 102; this may be facilitated by laser assembly 5000 in accordance with methods described in aforementioned U.S. Pat. No. 7,500,764, or otherwise. Alternatively, each fixture 1003 may be pivoted about two axes via adjustable armature 1007. Third axis adjustability could be provided at the fixture level or even at a sub-fixture level insomuch that some subset of the light producing portions (e.g., LEDs) of each fixture 1003 could be pivoted about a third axis via rotation of individual optics; third axis adjustability is discussed in U.S. Pat. No. 8,789,967 incorporated by reference herein in its entirety. In the state of the art, LED lighting fixture assembly 1000 could include any number of fixtures 1003, armatures 1007, and crossarms 1002, and could be of a back-to-back configuration such as that illustrated at reference number 103 of FIGS. 1 and 2.

Modification of LED lighting fixture assembly 1000 according to aspects of the present invention yields an LED lighting fixture assembly 2000 such as that in FIG. 3B. In practice, a mating interface 1004 is welded, glued, attached, or otherwise formed to a tapered pole section of fitter 1001 above crossarm 1002; such flange-type joint connections are sometimes common in the art of sports lighting when large pole sections necessitate bolt-on crossarms. FIGS. 3C and D illustrate in greater detail the differences in LED lighting fixtures assemblies 1000 and 2000, as well as greater detail of laser assembly 5000 common to both assemblies and a laser assembly 6000 associated with LED lighting fixture assembly 2000; laser assemblies 5000 and 6000 are later discussed in greater detail.

Mating interface 1004 is adapted to receive, sit flush against, or otherwise mate to a complementary mating interface 1005 of a mobile network device assembly which, as has been stated, could include a number of different devices. FIG. 4A, for example, illustrates a first mobile network device assembly 300A which includes a microwave device 400, canister 404, and lightning rod 405. Microwave device 400 might comprise an antenna in combination with an appropriate radio; for example, any of the VHLP models of antennas available from CommScope, Inc., Hickory, N.C., USA, and any of the TXL models of radios available from DragonWave, Inc., Ottawa, Ontario, Canada. Canister 404 may be formed from any RF-transmissive material (e.g., any of the Kydex® brand materials available from SEKISUI SPI, Bloomsburg, Pa., USA or StealthSkin™ brand materials available from Stealth Concealment Solutions, Inc., North Charleston, S.C., USA) and designed to contain or generally encapsulate any number of radios (e.g., any of the single, dual, or triple band radios available from Powerwave Technologies, Inc., Santa Ana, Calif., USA) or directional antennas (e.g., any of the TTTT models of beamforming antennas available from CommScope). Canister 404 could act as a structural component (e.g., providing a mounting interface for devices), could be purely aesthetic (e.g., to maintain the streamlined look of sports lighting poles and lighting systems when devices are installed), or could serve to add additional value to the partnership between the mobile network service provider and lighting designer (i.e., the aforementioned unrelated or outside entities) by including indicia that directly promotes the partnership, provides advertising space for the mobile network service provider (or their partner/licensees), is formed in a recognizable trade dress color or shape to indirectly promote the partnership, includes the mobile network service provider trademark or logo, or includes a school mascot (in the example of a sports field), for example. Canister 404 could comprise two or more of the foregoing (e.g., have structure and aesthetic features, and/or structural and indicia features, could include indicia spanning multiple spaced-apart canisters, etc.). Some specific non-limiting examples include forming canister 404 to have curvature which mimics well known glass beverage bottles such as the iconic Coca-Cola® glass bottle (e.g., if the mobile network service provider had a partnership with said beverage maker), coloring canister 404 the distinctive yellow of a film box (e.g., if the mobile network service provider had a partnership with said film producer), including an embossed logo 408 associated with the mobile network service provider, or printing the trademark 409 of the mobile network service provider.

FIG. 4B illustrates a second example of a possible mobile network device assembly for use in the invention. In this example, mobile network device assembly 300B generally comprises a microwave device 400, canister 404 housing one or more radios or filters (e.g., any of the FIM models of co-location filters available from Radio Frequency Systems, Meriden, Conn., USA), and an omnidirectional antenna 406 (e.g., any of the AW models of omniantennas available from Alpha Wireless, San Diego, Calif., USA). FIG. 4C illustrates a third example of a possible mobile network device assembly for use in the invention. In this example, mobile network device assembly 300C generally comprises a structural component 407 designed to provide a mounting interface for microwave device 400, as well as provide rigidity for canister 404. Canister 404, as has been stated, could enclose, support, or generally surround any number of mobile network devices.

FIGS. 5A-C generally illustrate how mobile network device assemblies 300A-C, respectively, may appear when mated, affixed, or otherwise joined to LED lighting fixture assembly 2000; it is of note that for clarity, optional indicia 408, 409 have been omitted. In practice, the exact configuration of a dual purpose monopole including both lighting fixtures and mobile network devices may differ from those illustrated herein. Regardless of the exact design, it is anticipated that the process by which disparate elevated devices may be co-located relative common features is the same; details of said process, and of associated apparatus, are presently discussed.

B. Exemplary Method and Apparatus Embodiment 1

Using the mobile network device assembly 300C of FIG. 4C as the example, FIGS. 6-10 illustrate in detail aspects according to the present invention. FIG. 6 illustrates an enlarged, partial view of FIG. 5C with a cutaway of canister 404 so to reveal a plurality of radios 401 and directional antennas 402 contained therein; though, it is of note that the boxy and diagrammatic look of radios 401 and antennas 402 are for convenience, and do not represent any actual product in shape or scope. FIG. 7 illustrates a further enlarged and isolated view of mobile network device assembly 300C of FIG. 5C showing the general location of components within canister 404—which is illustrated as being opened—as well as the general size and position of structural component 407. As envisioned, some portion of structural component 407 is hollow so to permit the internal routing of wiring 403 via handholes 412 (see FIG. 8); this is sometimes contrary to current practices of mobile network device wiring, yet is commensurate with sports lighting design such as that described in the aforementioned U.S. Pat. No. 7,500,764. In practice, wiring 403 could be coaxial cable, fiber optic cable, power wiring, or some combination thereof, and could exist as continuous wiring, or sections of wiring (see, e.g., wire section connectors 413A and B in FIGS. 10 and 14). As previously stated, a large portion of LED lighting fixture assembly 2000 and pole 102 are substantially hollow. Therefore, wiring the mobile network devices in a similar fashion to that of the lighting system ensures all wiring on the pole is shielded against theft and environmental effects (for example), while still maintaining a streamlined look common to sports lighting fixtures. A streamlined appearance is yet another way in which a lighting designer can add value to the partnership with the mobile network service provider—as there is sometimes a concern regarding aesthetics when erecting mobile network towers or poles in urban areas.

FIG. 9A illustrates mating interface 1004 as it may appear in isolation along view line A-A of FIG. 6; namely, when looking upward from the ground when LED assembly 2000 is in operational orientation. FIG. 9B illustrates a complementary mating interface 1005 as it may appear in isolation if viewed at a generally downward perspective; namely, from an exterior position on mobile network device assembly 300C looking downward. FIG. 9C illustrates an exploded perspective view of complementary mating interfaces 1004 and 1005 as they appear when generally co-located, as well as one possible orientation of laser assembly 6000 and one possible location for orientation indicia 3001. As can be seen from FIGS. 9A-C, mating interface 1004 generally comprises an annular section 500B including apertures (here, eight) through which a bolt 504 or other fastening device may at least partially pass through and be secured via nut 505. Mating interface 1005 generally comprises a complementary annular section 500A including arcuate apertures 503 (here, eight) through which aforementioned bolts 504 pass. The combination of apertures in mating interface 1004 and arcuate apertures 503 in mating interface 1005 permit a wide range of orientations—adjustable in small increments—which is well suited to the aiming needs of mobile network devices, as was previously discussed.

As can be seen from FIG. 10 which generally illustrates Detail B of FIG. 6 (but removing a portion of parts 407 and 102 so to illustrate internal components), wiring 403 from the mobile network devices may be routed through at least partially hollow structural member 407 (see again FIGS. 7 and 8), through mating interface 1005, through mating interface 1004, and connected to another wire section 502 (e.g., via connectors 413A and 413B) which is routed through at least partially hollow pole 102 (see again FIGS. 3B and 3D); alternatively, wires 403 could simply be terminated. The specific design of connectors (shown for convenience as simple blocks) or terminating device (not illustrated) will depend on the type of wiring (e.g., coaxial, power, fiber optic). If desired, strain relief/securing means 501 may be used in a similar fashion to that already used in sports lighting; again, a benefit extended to the art of mobile network design via strategic partnership with the art of precision lighting. Also if desired, an optional projection 506 could be included on the lower face of annular section 500B of mating interface 1004 (see FIG. 10) which at least partially extends into pole 102 to act as a wire guide and prevent pinching of wires 403/502 when mating interfaces are brought into abutment. The inner diameter of annular sections 500A and 500B (also referred to as plates) could also be tapered or of different diameters to provide a similar wire guide function.

Of course, before plates 500A and 500B of mating interfaces 1005 and 1004 can be bolted together, it is critical that mobile network device assembly 300C be in the correct orientation for operation of the components therein; this is achieved by geographically locating the mobile network device assembly relative a feature of the lighting fixture assembly, as well as providing indication of directional position. As can be seen from FIG. 9C, geographical orientation and directional position is provided via a simple laser assembly 6000 (e.g., such as is described in the aforementioned U.S. Pat. No. 7,500,764) angled upwardly towards the mobile device components, and indicia 3001 on one or both sides of mating interface 1005 and/or 1004; other orientations and positions of laser assembly 6000 and/or orientation indicia 3001 are later discussed. One possible method of providing the needed geographical orientation and directional position to reduce in situ adjustment of mobile network devices, as well as potentially permit factory wiring, aiming, and shipment of mobile network devices, is illustrated in FIGS. 11-13B, and is presently discussed.

As can be seen from FIG. 11, one possible method 4000 of co-locating disparate devices (e.g., lighting fixtures, microwave devices) on a common elevating structure includes a first step 4001 of determining geographic orientation and directional position of a lighting design. Step 4001 generally comprises determining the directional position (e.g., geographic coordinates) of a target area. Once known, pole locations and heights may be determined relative the target area taking into account any limitations such as nearby residences, bleachers, height of a ball in play, lines of sight of players, and the like. Whether determined manually or by lighting design software, the logic flows thusly:

- target area X is a U12 soccer field used for non-televised recreation play and located at xx°xx'xx"N, xx°xx'x"W
- minimal site restrictions permit a four-pole layout at a mounting height of Y feet
- per IESNA RP-6 (recommended practices for sports and recreational area lighting), minimum light levels and uniformity could be achieved using four lighting fixtures (i.e., one fixture per pole) of Z design
- to achieve said light levels and uniformity, fixture aiming is as follows:
  Pole 1, fixture 1=left x°, right y°, tilt z°relative 0,0,0
  Pole 2, fixture 1=. . .
  Pole 3 . . .
  Pole 4 . . .

where 0,0,0 is defined by the lighting designer either at a local (i.e., geographically oriented) level (e.g., 0,0,0 is the center point of the center circle) or a global (i.e., directionally oriented) level (e.g., yy°yy'yy"N, yy°yy'yy"W)

So it can be seen that a starting lighting design geographically oriented relative the target area (e.g., field of play) is also directionally oriented insomuch that the target area is defined in terms of absolute directional position (e.g., 38°53'23"N, 77°00'27"W).

Knowing the absolute directional position of each pole location (and its height) from the previous step, one may determine all the aiming angles (e.g., α, β, γ) for each mobile network device at their desired mounting height according to step 4002. In practice, mobile network service providers may specify that devices be aimed relative to cardinal North, "true" North, or otherwise—step 4002 proceeds accordingly using the information from step 4001.

Step 4003 generally comprises finalizing the lighting design and determining all the features of the lighting fixtures themselves; namely, the number, design, and orientation of light producing elements, light directing elements, and light redirecting elements necessary to adequately illuminate the three-dimensional space of the lighting design of step 4001 to one or more defined lighting conditions. Said lighting conditions might comprise a minimum light level, a desired uniformity between different points in the lighting design, etc., taking into account any limitations such as nearby features (e.g., observatories), level of play, and the like. Step 4003 may include such things as adding or removing light sources from a fixture, choosing a reflector instead of a lens for a particular light source, or setting the aiming angle of one or more visors. A lighting designer may have to re-evaluate lighting design choices according to step 4003 if, for example, setting the aiming angle of a lighting fixture visor would interfere with the aiming of a mobile network device.

The above is, of course, a simplification of a complex process—and ignores any additional complexities due to budgeting, advances in lighting design (e.g., availability of high efficacy LEDs versus HIDs), or finer scale aiming (e.g., aiming at the LED level rather than fixture level)—but it is a suitable description for purposes of the invention. What is important to note about the above is all lighting fixtures are aimed relative the target area (e.g., via laser assembly 5000) which permits a safety buffer insomuch that if the actual target area is in a different place than planned (e.g., moved because of a tree), the lighting system can likewise move, the system be re-aimed, and the precision of the lighting design is not impacted—a benefit that is likewise realized when installing mobile network devices on the common pole. For example, as will be seen from subsequent figures and discussion, because mobile network devices are located relative the pole or other elevating structure while simultaneously providing a reference to a cardinal direction, if change of a target area necessitates change of a lighting system pole, said mobile network devices can still be reconfigured or otherwise re-aimed—both at the factory, and in situ.

Once fully designed in accordance with the previous steps, an actual lighting system may be constructed and factory wired/aimed according to step 4004 of method 4000. Step 4004 generally comprises constructing each lighting fixture to precise specifications (see, e.g., U.S. Pat. No. 7,874,055 incorporated by reference herein in its entirety), grouping components of the lighting system (e.g., wiring, enclosures, pole sections, lighting fixtures) into easily shippable groups, and either setting the various components at factory-aimed positions (e.g., at the specific aiming angles determined in previous steps of method 4000) or in neutral positions that can be easily "snapped" or otherwise set into the correct position in the field; this latter approach is discussed in greater detail in U.S. Pat. No. 7,600,901 incorporated by reference herein in its entirety. This is, again, a simplification of a complex process—for example, ignoring discussion of how tilt and pan positions in lighting design software are translated into aiming angles of actual components on the factory floor—but it is a suitable description for purposes of the invention.

In a likewise fashion, mobile network devices may be factory assembled according to step 4005. For example, FIG. 7 illustrates a structural component 407 to which microwave devices 400, radios 401, and directional antennas 402 may be directly affixed or co-located. Structural component 407 is welded, joined, or otherwise affixed to or in operative connection with mating interface 1005 which, as has been stated, includes indicia 3001 intended to provide geographic orientation or directional position. In the particular example of FIGS. 12A-13B indicia 3001 comprises an arrow which points to North when in the correct geographic orientation (e.g., when located relative to a particular spot on crossarm 1002 of LED lighting fixture assembly 2000). A lighting designer may rely upon precision aiming technology already existing in the art—see, for example, U.S. Pat. No. 8,300,219 incorporated by reference herein in its entirety—to mount mobile network devices to a structural component 407 which has a longitudinal axis coinciding with that of pole 102 and factory aim the devices given a reference (here, North as indicated by indicia 3001); this is another benefit of a mobile network service provider partnering with a precision lighting provider.

Once geographically located relative to one another, each mobile network device may be secured in its operational orientation (i.e., at its specific aiming angles, frequencies, polarizations, etc. as determined by the mobile network service provider) via clamp, bolt, or analogous device. Alternatively, each mobile network device may be secured in a neutral position, and then pivoted and "locked" into its operational orientation in a similar fashion to that described in aforementioned U.S. Pat. No. 7,600,901 (see, e.g., discussion of the "stop strap" feature). If desired, each canister or section of mobile network devices may be pre-wired and the wiring terminated at a connector half so to permit "plug and play" functionality once on site; namely, to avoid having to do any in situ wiring of mobile network devices once power or other wiring is run along pole 102. This is generally illustrated in FIG. 14; note how four groupings of mobile network devices are pre-wired and the wiring run to connectors 413A. Connectors 413A are readily accessible via handholes 412 such that when wiring is run up pole 102 and connectors 413A and 413B are brought into operative connection (see also FIG. 10), nothing further is required to power or otherwise put into operation the factory-aimed mobile network devices—which minimizes inadvertently knocking said devices out of alignment or exposing said devices to moisture or other environmental effects once on site.

Once all components—both lighting system and mobile network devices—have been designed, manufactured, factory wired, factory aimed, and shipped to the site, a next step 4006 comprises confirming onsite orientation. As is well known in the art of sports lighting, a good deal of trenching may be required to wire all components, and as is known from aforementioned U.S. Pat. No. 7,500,764 bases must be set and plumbed for correct operation. Pole foundations are sometimes set in the wrong place, and sometimes a target area is not at the original coordinates. For these and other reasons it is important to first verify onsite orientation prior to installing the factory-aimed devices on the pole. This can be achieved by activating fixture laser assembly 5000 on a pole section, erecting said pole section, and verifying it is in a known relationship with both the field and North (or "true" North, depending on how mobile network devices were oriented in previous steps of method 4000)—because, as has been already stated, all disparate devices are co-located to a common point, and in the examples set forth herein that common point is located with laser assembly 5000. In practice, said laser assembly may be on the same pole section as the lighting fixtures (see reference no. 2000, FIG. 3B) and so in such a situation step 4006 flows thusly:

lower pole sections are set the top fitter portion including pre-aimed lighting fixtures is set on the lower pole sections the lighting fixture assembly is then geographically oriented by pivoting the entire array of lighting fixtures until laser assembly 5000 strikes a certain point on the field North, "true" North, or the desired direction is located relative to the laser line any needed correction to the aiming of mobile network devices is noted According to a next step 4007 the lighting fixtures and mobile network devices are assembled. In practice, the following may occur on the ground, in the air at the pole, or a combination of both—depending on the previous step. Lighting fixtures are rotated and "snapped" into their final orientation from their neutral positions (if applicable). Following this, a mobile network device assembly 300A, B, or C is lowered onto oriented LED lighting fixture assembly 2000 such that mating interfaces 1004/1005 are brought into abutment. Once interfaces 1004 and 1005 are brought into abutment —but prior to securing bolts 504 or connecting wire sections—mobile network device assembly 300A, B, or C may be pivoted until light from a laser assembly 6000 strikes a known area so to indicate correct geographic orientation; one example of this is illustrated in FIGS. 12A and B. As can be seen, light from laser assembly 6000 projects generally downward towards crossarm 1002 of LED lighting fixture assembly 2000 which according to steps 4001-4005 has already been geographically oriented (i.e., located relative the target area at a local level), as well as directionally oriented by extension (i.e., located at a global level by knowledge of the target area on a global level). What is important to note about these figures is that correct rotation of mobile network device assembly 300A, B, or C provides not only correct geographic orientation, but also correct directional position. As can be seen in FIGS. 12A and B, once the light from laser assembly 6000 strikes indicia 3002 of crossarm 1002 (e.g., a small square of reflective material so to create a perceivable "flash" of light when the laser strikes it), indicia 3001 of mating interface 1005 indicate an absolute direction; in this example, North. Of course, laser assembly 6000 might be in a different orientation; for example, to accommodate a smaller interface 1004/1005 (e.g., compare the relative size of 1004/1005 in FIGS. 13A and B versus FIGS. 12A and B) or to provide finer rotation in determining correct orientation. FIGS. 13A and B illustrate laser assembly 6000 in a vertical orientation shooting upward towards the mobile network device assembly rather than in an angled downward orientation shooting towards a crossarm. The orientation of FIGS. 13A and B may be preferred, for example, if the spacing between laser 6000 and crossarm 1002 is too close to permit the fine degree of pivoting desired. In the scenario of FIGS. 13A and B method 4000 proceeds in much of the same fashion as previously described; the exception is that when the mobile network device assembly is pivoted, a technician or other person would be looking upward towards canister 404 for the perceivable "flash" when the laser strikes a reflective surface 3002.

Once correct geographic orientation of all devices is secured, and once correct reference to directional position is known, according to a final step 4007 the mobile network device assembly may be fully secured (e.g., by bolting mating interfaces 1004 and 1005 together) and assembly of all devices (mobile network or lighting) completed (e.g., by connecting wire sections 403 and 502). Step 4007 may further comprise verification of factory aiming angles, a final check of orientation relative to North (or any other reference), and re-aiming or adjusting aiming of mobile network devices. For example, it is anticipated minor further adjustments may be needed given the precision with which microwave devices across significant distances must face one another to maintain point-to-point communications. A technician may need to slightly adjust a set screw of a bracket which clamps microwave device 400 to structural component 407. In some extreme instances, interfaces 1004/1005 may need to be unbolted and pivoted slightly— particularly in situations where correction of the aiming angles for the mobile network devices is needed because of incorrect site conditions (see step 4006). As previously stated, a plurality of apertures and arcuate slots 503 are provided in surfaces 500A and 500B for precisely this reason—to provide near infinite pivoting while still ensuring sections can be secured together without concern of structural integrity or moisture ingress.

If desired, at least some portion of re-aiming according to step 4007 could occur at ground level, rather than when elevated at the pole. Also, commercially available sealing material (e.g., any of the BA series of boot assembly kits available from Valmont Site Pro 1, Hauppauge, N.Y., USA) could interpose interfaces 1004/1005 or otherwise provide a seal around wiring; alternatively, each wire could be sealed individually (e.g., using any of the Heyco® brand cordgrips with associated grommets available from Heyco Products, Inc., Toms River, N.J., USA).

The end result of method 4000 is a dual-purposed monopole—a pole which houses lighting fixtures precisely aimed to a target area so to provide needed lighting, as well as housing one or more mobile network devices precisely aimed to (i) devices across great distances and (ii) relative an absolute (e.g., cardinal) direction. This approach to factory wiring and aiming not only adds value to partnerships between mobile network providers and lighting designers, but also marks a departure from state-of-the-art approaches such as that described in aforementioned U.S. Pat. No. 7,500,764. For example, according to the present invention mobile network devices are not located relative the target area (as in aforementioned U.S. Pat. No. 7,500,764)— because the sometimes significantly different requirements of mobile network devices on a common pole could require a person not standing on a field looking for a perceivable flash of light, but a mile off in any number of directions (or out in a street). This would simply not be a meaningful improvement over the current laborious approach to aiming mobile network devices. Instead, at least one embodiment of the present invention takes the approach of factory aiming the mobile network devices to some known origin or "zero point" and then correlating that zero point to the zero point of the array of lighting fixtures, and then deriving a cardinal direction for display for further in situ adjustment—an approach that is anticipated to greatly reduce the time and cost associated with onsite commissioning of mobile network devices.

C. Options and Alternatives

The invention may take many forms and embodiments. The foregoing examples are but a few of those. To give some sense of some options and alternatives, a few examples are given below.

The figures have illustrated a number of components which could be used in any particular mobile network device assembly; it is to be understood that these components are only generically rendered, and do not represent any particular product. Further, any number of mobile network devices in any number of configurations could be used and not depart from aspects according to the present invention. For example, as can be seen in FIG. 14, a mobile network device assembly 300D might additionally include one or more fans 411 to provide cooling of mobile network devices (shown here diagrammatically as waves of heat emanating up and out of an open canister 404). This may necessitate a structural component 410 to lift lightning rod 405 up and away from canister 404 so to provide a path for heat to escape. Said fans may be relatively low powered—so low powered that they may draw power from radios 401. As another example, multiple stacks of radios 401 and antennas 402 could be included in a mobile network device assembly; FIGS. 16A and B, for example, illustrate two full stacks. FIGS. 16A and B also illustrate how a mobile network device assembly 300E might include a structural framework 3000 to provide a mounting surface or rigidity in the event canister material is flexible or sheet-like.

Likewise, the lighting fixture assembly may differ from that illustrated, and not depart from aspects according to the present invention. For example, a lighting fixture assembly may include more or fewer fixtures or crossarms, may be in a back-to-back configuration or have a tilted fitter portion (e.g., portion 1001 tilted from vertical), and the like. Further, the dual purpose monopole—on the whole—may differ from that illustrated herein and not depart from aspects according to the present invention. Mobile network devices might be coupled with pennants requiring precise aiming relative a crowd rather than a row of lighting fixtures requiring precise aiming relative a field of play—lighting fixtures may not even be present on the pole or other elevating structure. In fact, no assemblies or devices other than laser assembly 5000 and mating interface 1004 may exist on a pole—and still not depart from aspects according to the present invention. This lends itself well to scenarios in which a lighting designer, for example, desires to add value to the aforementioned partnership with mobile network service providers but not in the context of an already lit sports field. A lighting designer could instead take on the role of an OEM of pre-aimed poles and devices. As another example, the dual purpose monopole might not be substantially hollow, or might have the lighting fixtures mounted above the mobile network devices, or might have a different spacing between lighting fixture assemblies and mobile network device assemblies. As another example, pole sections could be thicker in places (e.g., to prevent deflection under strong wind conditions which could adversely impact mobile network device signals).

It should also be noted that method 4000 as set forth in FIG. 11 is but one way to practice the invention; alternative methods are possible, and envisioned. For example, a number of assembly steps could occur on the ground—as opposed to in an elevated position—if using slip-fit pole sections. As another example, determining North (or other relevant cardinal direction, or even "true" North as it relates to a magnetic axis) could be determined for either assembly (lighting fixture or mobile network device) at a different step in the process; this is likewise true for determining geographic location. Mating interfaces 1004 and 1005 could also be different; one example is illustrated in FIG. 15. As can be seen, mating interface 1006 has taken the place of previous mating interface 1005 and mating interface 1005 now includes fewer apertures, apertures that are threaded differently, or blind holes. The goal is to permit near infinite pivoting and securing of mating interface 1006 relative mating interface 1004, but only a single correct pivot/securing orientation of a third mating interface 1005 such that it is impossible to get an incorrect orientation of mobile network device assemblies once all three interfaces are bolted together in commensurate alignment (per indicia 3001).

What is claimed is:

1. A system for elevating an assembly of disparate pre-wired, pre-aimed components comprising:
   a. a base;
   b. an elevating structure providing a reference axis and having an internal space, at least a portion of the elevating structure slipfittable onto the base to allow rotation of the elevating structure relative to the base;
   c. mounting structure to mount the assembly in a known relationship to the elevating structure such that the mounting structure can be mounted in an accurate relationship to the reference axis of the elevating structure but have rotational adjustability around that axis comprising:
      i. an annular plate having a plurality of openings or slots relative to the elevating structure so to (i) limit adjustment of the assembly relative to the elevating structure to a predefined rotation and (ii) permit routing of wiring into and along the internal space of the elevating structure;
   d. a device to confirm correct rotational position of the elevating structure when slip-fit onto the base comprising a first laser aimed towards a target area; and
   e. a device to confirm correct rotational position of the assembly relative to the reference axis when mounted comprising a second laser aimed towards a feature other than the target area or indicia on said plate.

2. The system of claim 1 having at least two of said assemblies wherein the first assembly is a lighting fixture having an aiming angle to the target area and the second assembly is a mobile network device having an aiming direction informed by a mobile communications network and not the target area.

3. A method for efficient installation on the same elevating structure of both a lighting fixture assembly including a mounting structure supporting one or more lighting fixtures and a mobile network device assembly including a mounting structure supporting one or more mobile network devices, where each said lighting fixture has an independent aiming direction according to a predetermined lighting design for a target area to be illuminated and each said mobile network device has an independent aiming direction according to a predetermined mobile network design for a geographical area at or around the target area, and the elevating structure has a known height and position relative to the target area, comprising:

a. pre-aiming each said lighting fixture on the mounting structure of the lighting fixture assembly correlated to the predetermined lighting design wherein the pre-aiming is based on:
   i. an assumed installed elevated height, geographic position and directional orientation correlated to the predetermined lighting design; and
   ii. an assumed reference to a geographic position or directional orientation relative to earth;
b. pre-aiming each said mobile network device on the mounting structure of the mobile network device assembly correlated to the predetermined mobile network design wherein the pre-aiming is based on:
   i. an assumed geographic position and directional orientation correlated to the predetermined mobile network design;
c. installing the pre-aimed lighting fixture assembly on the elevating structure in alignment with the target area to satisfy accurate alignment of the pre-aimed lighting fixtures with the predetermined lighting design; and
d. installing the pre-aimed mobile network device assembly on the elevating structure in alignment with a reference on the pre-aimed and installed lighting fixture assembly;
e. so that once the pre-aimed lighting fixture assembly is installed in correct alignment, the pre-aimed mobile network device assembly can be installed in correct alignment by reference to the installed pre-aimed lighting fixture assembly, and each of the lighting fixtures and mobile network devices will automatically be aimed according to the lighting and mobile network device designs.

4. The method of claim 3 wherein the assumed reference to a geographic or directional orientation relative to earth comprises:
a. a cardinal direction; or
b. a point or direction relative to the target area.

5. The method of claim 3 wherein the pre-aiming of the lighting fixtures comprises:

a. positioning the lighting fixture assembly in an assembling position away from the elevating structure relative to projection or simulation of the lighting design; and
b. adjusting and fixing each lighting fixture on the lighting fixture support into alignment with the projection or simulation of the lighting design.

6. The method of claim 3 wherein the pre-aiming of the mobile network devices comprises:
a. positioning the mobile network device assembly in an assembling position away from the elevating structure relative to projection or simulation of the mobile network device design; and
b. adjusting and fixing each mobile network device on the mobile network device support into alignment with the projection or simulation of the mobile network device design.

7. The method of claim 3 wherein the step of installing the pre-aimed lighting fixture assembly on the elevating structure in alignment with the target area comprises tracking position of a laser which is (i) in a pre-determined position and with a known aiming direction relative to the lighting fixture assembly, and (ii) projectable to a reference position or in a reference direction relative to the target area.

8. The method of claim 3 wherein the step of installing the pre-aimed mobile network device assembly on the elevating structure in alignment with a reference on the pre-aimed and installed lighting fixture assembly comprises tracking position of a laser which is (i) in a pre-determined position and with a known aiming direction relative to the mobile network device assembly, and (ii) projectable to a reference on the lighting fixture assembly.

9. The method of claim 8 wherein the reference on the lighting fixture assembly comprises a reflective member.

10. The method of claim 3 wherein:
a. the target area comprises a sport field; and
b. the elevating structure comprises a pole.

11. The method of claim 10 applied to a plurality of elevating structures for the target area.

\* \* \* \* \*

UNITED STATES PATENT AND TRADEMARK OFFICE
CERTIFICATE OF CORRECTION

PATENT NO. : 10,199,712 B1
APPLICATION NO. : 15/260464
DATED : February 5, 2019
INVENTOR(S) : Timothy Boyle et al.

Page 1 of 1

It is certified that error appears in the above-identified patent and that said Letters Patent is hereby corrected as shown below:

On the Title Page

Item (74):
REMOVE --Buer-- after the words Jessica R.
INSERT --Boer-- after the words Jessica R.

Signed and Sealed this
Second Day of April, 2019

Andrei Iancu
*Director of the United States Patent and Trademark Office*